(12) United States Patent
Jiang et al.

(10) Patent No.: US 12,476,747 B2
(45) Date of Patent: Nov. 18, 2025

(54) TECHNIQUES FOR SPATIALLY COUPLED MULTIPLE-INPUT MULTIPLE-OUTPUT SIGNALING

(71) Applicant: QUALCOMM Incorporated, San Diego, CA (US)

(72) Inventors: Jing Jiang, San Diego, CA (US); Wei Yang, San Diego, CA (US); Gabi Sarkis, San Diego, CA (US); Thomas Joseph Richardson, South Orange, NJ (US)

(73) Assignee: Qualcomm Incorporated, San Diego, CA (US)

( * ) Notice: Subject to any disclaimer, the term of this patent is extended or adjusted under 35 U.S.C. 154(b) by 402 days.

(21) Appl. No.: 18/061,993

(22) Filed: Dec. 5, 2022

(65) Prior Publication Data

US 2024/0187152 A1 Jun. 6, 2024

(51) Int. Cl.
*H04W 72/04* (2023.01)
*H04L 1/16* (2023.01)
*H04L 5/00* (2006.01)

(52) U.S. Cl.
CPC ........... *H04L 5/0023* (2013.01); *H04L 1/16* (2013.01)

(58) Field of Classification Search
CPC ....... H04L 1/0047; H04L 1/0057; H04L 1/16; H04L 5/0023; H04L 5/003
See application file for complete search history.

(56) References Cited

U.S. PATENT DOCUMENTS

| | | | | |
|---|---|---|---|---|
| 8,917,796 B1* | 12/2014 | Mayrench | ............ | H04B 7/0697 375/267 |
| 11,171,748 B2 | 11/2021 | Zhu et al. | | |
| 2010/0239035 A1* | 9/2010 | Blankenship | ......... | H04L 1/0656 375/260 |
| 2010/0303016 A1* | 12/2010 | Jin | ...................... | H04L 27/0008 370/328 |

(Continued)

FOREIGN PATENT DOCUMENTS

EP 3713120 A1 * 9/2020 ............ H04B 7/024
WO WO-2010087666 A2 8/2010

OTHER PUBLICATIONS

International Search Report and Written Opinion—PCT/US2023/079986—ISA/EPO—Mar. 13, 2024 (2208720WO).

*Primary Examiner* — Phuc H Tran
(74) *Attorney, Agent, or Firm* — Holland & Hart LLP

(57) ABSTRACT

Methods, systems, and devices for wireless communications are described. The described techniques generally provide for spatially coupled multiple-in multiple-out (MIMO) signaling for a single codeword across multiple layers. A transmitting device may transmit, via multiple time-frequency resources using multiple spatial layers, a set of code blocks associated with a codeword. At a first time-frequency resource, each code block of a first subset of the set of code blocks may be mapped to a respective transmission layer, and at a second time-frequency resource, each code block of a second subset of the set of code blocks may be mapped to a respective transmission layer, where the second set of code blocks is staggered from the first set of code blocks. By staggering code blocks across multiple time-frequency resources, a receiving wireless device may cancel out interference of one or more previously decoded code blocks.

30 Claims, 16 Drawing Sheets

(56) References Cited

U.S. PATENT DOCUMENTS

2011/0261775 A1* 10/2011 Kim ............... H04L 1/0057
  370/329
2018/0132227 A1* 5/2018 Ghosh ............. H04W 72/21
2019/0334585 A1* 10/2019 Lee ............... H04L 5/0023

* cited by examiner

TECHNIQUES FOR SPATIALLY COUPLED MULTIPLE-INPUT MULTIPLE-OUTPUT SIGNALING

FIELD OF TECHNOLOGY

The following relates to wireless communications, including techniques for spatially coupled multiple-input multiple-output signaling.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

Some wireless devices may communicate data via multiple spatial layers, such as in a multiple-in multiple-out (MIMO) configuration. For instance, a transmitting wireless device may transmit multiple data streams using multiple spatial layers via a same time-frequency resource.

SUMMARY

The described techniques relate to improved methods, systems, devices, and apparatuses that support techniques for spatially coupled multiple-input multiple-output signaling. For example, the described techniques provide for spatially coupled multiple-in multiple-out (MIMO) signaling for a single codeword across multiple layers. A transmitting device may transmit, via multiple time-frequency resources using multiple spatial layers (e.g., communicated using various antenna ports or demodulated reference signal (DMRS) ports of the transmitting device), a set of code blocks associated with a codeword (e.g., data intended for a receiving device). At a first time-frequency resource, each code block of a first subset of the set of code blocks may be mapped to a respective transmission layer, and at a second time-frequency resource, each code block of a second subset of the set of code blocks may be mapped to a respective transmission layer, where the second set of code blocks is staggered from the first set of code blocks. For example, if the first set of code blocks includes code blocks 1 through 4, the second set of code blocks may include code blocks 2 through 5. By staggering code blocks across multiple time-frequency resources, a receiving wireless device may cancel out known information of one or more code blocks (e.g., decoded in a prior resource element, a known sequence of information, or the like), which may support decoding of an unknown code block (e.g., a first reception of a code block).

A method for wireless communications at a receiving device is described. The method may include receiving, via a set of multiple time-frequency resources using a set of multiple spatial layers, a set of multiple code blocks associated with a codeword, where the set of multiple code blocks includes a first subset of code blocks that are each received using fewer than all of the set of multiple spatial layers and a second subset of code blocks that are each received using all spatial layers of the set of multiple spatial layers, each code block of all of the second subset of code blocks and some of the first subset of code blocks being received in multiple code block portions, each of the multiple code block portions associated with a respective code block being received in different time-frequency resources of the set of multiple time-frequency resources and across different spatial layers of the set of multiple spatial layers, decoding a first code block of the first subset of code blocks based on the first code block being received using fewer than all of the set of multiple spatial layers, and decoding, successively, additional code blocks of the first subset of code blocks or of the second subset of code blocks, or both, based on cancellation of at least one of the first code block or other previously decoded code blocks of the set of multiple code blocks from a respective signal associated with a corresponding one of the additional code blocks and received during a corresponding time-frequency resource of the set of multiple time-frequency resources.

An apparatus for wireless communications at a receiving device is described. The apparatus may include a processor, memory coupled with the processor, and instructions stored in the memory. The instructions may be executable by the processor to cause the apparatus to receive, via a set of multiple time-frequency resources using a set of multiple spatial layers, a set of multiple code blocks associated with a codeword, where the set of multiple code blocks includes a first subset of code blocks that are each received using fewer than all of the set of multiple spatial layers and a second subset of code blocks that are each received using all spatial layers of the set of multiple spatial layers, each code block of all of the second subset of code blocks and some of the first subset of code blocks being received in multiple code block portions, each of the multiple code block portions associated with a respective code block being received in different time-frequency resources of the set of multiple time-frequency resources and across different spatial layers of the set of multiple spatial layers, decode a first code block of the first subset of code blocks based on the first code block being received using fewer than all of the set of multiple spatial layers, and decode, successively, additional code blocks of the first subset of code blocks or of the second subset of code blocks, or both, based on cancellation of at least one of the first code block or other previously decoded code blocks of the set of multiple code blocks from a respective signal associated with a corresponding one of the additional code blocks and received during a corresponding time-frequency resource of the set of multiple time-frequency resources.

Another apparatus for wireless communications at a receiving device is described. The apparatus may include means for receiving, via a set of multiple time-frequency resources using a set of multiple spatial layers, a set of multiple code blocks associated with a codeword, where the set of multiple code blocks includes a first subset of code blocks that are each received using fewer than all of the set of multiple spatial layers and a second subset of code blocks that are each received using all spatial layers of the set of multiple spatial layers, each code block of all of the second subset of code blocks and some of the first subset of code blocks being received in multiple code block portions, each of the multiple code block portions associated with a respective code block being received in different time-frequency resources of the set of multiple time-frequency resources and across different spatial layers of the set of multiple spatial layers, means for decoding a first code block of the first subset of code blocks based on the first code block being received using fewer than all of the set of multiple spatial layers, and means for decoding, successively, additional code blocks of the first subset of code blocks or of the second subset of code blocks, or both, based on cancellation of at least one of the first code block or other previously decoded code blocks of the set of multiple code blocks from a respective signal associated with a corresponding one of the additional code blocks and received during a corresponding time-frequency resource of the set of multiple time-frequency resources.

A non-transitory computer-readable medium storing code for wireless communications at a receiving device is described. The code may include instructions executable by a processor to receive, via a set of multiple time-frequency resources using a set of multiple spatial layers, a set of multiple code blocks associated with a codeword, where the set of multiple code blocks includes a first subset of code blocks that are each received using fewer than all of the set of multiple spatial layers and a second subset of code blocks that are each received using all spatial layers of the set of multiple spatial layers, each code block of all of the second subset of code blocks and some of the first subset of code blocks being received in multiple code block portions, each of the multiple code block portions associated with a respective code block being received in different time-frequency resources of the set of multiple time-frequency resources and across different spatial layers of the set of multiple spatial layers, decode a first code block of the first subset of code blocks based on the first code block being received using fewer than all of the set of multiple spatial layers, and decode, successively, additional code blocks of the first subset of code blocks or of the second subset of code blocks, or both, based on cancellation of at least one of the first code block or other previously decoded code blocks of the set of multiple code blocks from a respective signal associated with a corresponding one of the additional code blocks and received during a corresponding time-frequency resource of the set of multiple time-frequency resources.

In some examples of the method, apparatuses, and non-transitory computer-readable medium described herein, decoding, successively, the additional code blocks may include operations, features, means, or instructions for decoding a first portion of an additional code block of the first subset of code blocks to obtain information bits based on a cancellation of a second portion of the additional code block of the first subset of code blocks.

In some examples of the method, apparatuses, and non-transitory computer-readable medium described herein, decoding the first code block of the first subset of code blocks may include operations, features, means, or instructions for decoding information with a high priority from the first code block based on the first code block having a known sequence.

In some examples of the method, apparatuses, and non-transitory computer-readable medium described herein, the information with the high priority corresponds to a medium access control (MAC) message, a high priority logical channel, a MAC header, a radio link control (RLC) header, a physical data convergence protocol (PDCP) header, a transmission control protocol (TCP) header, or any combination thereof.

Some examples of the method, apparatuses, and non-transitory computer-readable medium described herein may further include operations, features, means, or instructions for transmitting, in response to the set of multiple code blocks associated with the codeword, a feedback message indicating a first acknowledgment feedback for the first subset of code blocks and a second acknowledgment feedback for the second subset of code blocks.

Some examples of the method, apparatuses, and non-transitory computer-readable medium described herein may further include operations, features, means, or instructions for decoding, during a middle one or more code blocks of the codeword in the first subset of code blocks, the middle one or more code blocks based on the middle one or more code blocks having a known sequence.

Some examples of the method, apparatuses, and non-transitory computer-readable medium described herein may further include operations, features, means, or instructions for decoding, during a middle duration in time of the set of multiple time-frequency resources, a third subset of blocks with a lower modulation and coding scheme (MCS) than a MCS applied for the first subset of code blocks and the second subset of code blocks.

In some examples of the method, apparatuses, and non-transitory computer-readable medium described herein, decoding the first code block may include operations, features, means, or instructions for decoding the first code block of the first subset of code blocks based on the first code block including a zero-power signal.

In some examples of the method, apparatuses, and non-transitory computer-readable medium described herein, the first subset of code blocks includes a first quantity of information bits, and the second subset of code blocks includes a second quantity of information bits that may be greater than the first quantity of information bits.

In some examples of the method, apparatuses, and non-transitory computer-readable medium described herein, the decoding may be based on a first processing time associated with decoding the first subset of code blocks and the second subset of code blocks, where a second processing time associated with decoding a third subset of code blocks may be shorter than the first processing time, and where each code block of the third subset of code blocks occupy a same quantity of spatial layers of the set of multiple spatial layers.

In some examples of the method, apparatuses, and non-transitory computer-readable medium described herein, a size of a transport block corresponding to the codeword may be based on a quantity of time-frequency resources of the set of multiple time-frequency resources, a MCS for the codeword, and a quantity of code blocks in the second subset of code blocks.

In some examples of the method, apparatuses, and non-transitory computer-readable medium described herein, communicating control signaling indicating a mapping of the set of multiple code blocks to the set of multiple spatial layers across the set of multiple time-frequency resources, where the decoding may be based on the mapping.

In some examples of the method, apparatuses, and non-transitory computer-readable medium described herein, the first code block may be received via a first spatial layer with a highest channel quality of the set of multiple spatial layers, where decoding, successively, the additional code blocks may be based on an ordering of the set of multiple spatial layers based on corresponding channel qualities.

In some examples of the method, apparatuses, and non-transitory computer-readable medium described herein, a set of multiple portions of the first code block may be received via a first time-frequency resource of the set of multiple time-frequency resources using multiple spatial layers of the set of multiple spatial layers.

Some examples of the method, apparatuses, and non-transitory computer-readable medium described herein may further include operations, features, means, or instructions for transmitting a feedback message indicating an index of a code block of the set of multiple code blocks corresponding to a decoding failure and receiving, via a second set of multiple time-frequency resources using the set of multiple spatial layers, a retransmission of a portion of the set of multiple code blocks from the code block corresponding to the decoding failure to a last code block of the set of multiple code blocks.

A method for wireless communications at a transmitting device is described. The method may include encoding, for transmission via a set of multiple time-frequency resources and via a set of multiple spatial layers, a set of multiple code blocks associated with a codeword, where the set of multiple code blocks are encoded into a first subset of code blocks that are each to be transmitted using fewer than all of the set of multiple spatial layers and into a second subset of code blocks that are each to be transmitted using all spatial layers of the set of multiple spatial layers, each code block of all of the second subset of code blocks and some of the first subset of code blocks being encoded for transmission in multiple code block portions, each of the multiple code block portions associated with a respective code block being encoded for transmission in different time-frequency resources of the set of multiple time-frequency resources and across different spatial layers of the set of multiple spatial layers and transmitting respective signals during corresponding time-frequency resources of the set of multiple time-frequency resources, each of the respective signals including one or more code blocks from the first subset of code blocks, one or more code blocks from the second subset of code blocks, or combinations thereof.

An apparatus for wireless communications at a transmitting device is described. The apparatus may include a processor, memory coupled with the processor, and instructions stored in the memory. The instructions may be executable by the processor to cause the apparatus to encode, for transmission via a set of multiple time-frequency resources and via a set of multiple spatial layers, a set of multiple code blocks associated with a codeword, where the set of multiple code blocks are encoded into a first subset of code blocks that are each to be transmitted using fewer than all of the set of multiple spatial layers and into a second subset of code blocks that are each to be transmitted using all spatial layers of the set of multiple spatial layers, each code block of all of the second subset of code blocks and some of the first subset of code blocks being encoded for transmission in multiple code block portions, each of the multiple code block portions associated with a respective code block being encoded for transmission in different time-frequency resources of the set of multiple time-frequency resources and across different spatial layers of the set of multiple spatial layers and transmit respective signals during corresponding time-frequency resources of the set of multiple time-frequency resources, each of the respective signals including one or more code blocks from the first subset of code blocks, one or more code blocks from the second subset of code blocks, or combinations thereof.

Another apparatus for wireless communications at a transmitting device is described. The apparatus may include means for encoding, for transmission via a set of multiple time-frequency resources and via a set of multiple spatial layers, a set of multiple code blocks associated with a codeword, where the set of multiple code blocks are encoded into a first subset of code blocks that are each to be transmitted using fewer than all of the set of multiple spatial layers and into a second subset of code blocks that are each to be transmitted using all spatial layers of the set of multiple spatial layers, each code block of all of the second subset of code blocks and some of the first subset of code blocks being encoded for transmission in multiple code block portions, each of the multiple code block portions associated with a respective code block being encoded for transmission in different time-frequency resources of the set of multiple time-frequency resources and across different spatial layers of the set of multiple spatial layers and means for transmitting respective signals during corresponding time-frequency resources of the set of multiple time-frequency resources, each of the respective signals including one or more code blocks from the first subset of code blocks, one or more code blocks from the second subset of code blocks, or combinations thereof.

A non-transitory computer-readable medium storing code for wireless communications at a transmitting device is described. The code may include instructions executable by a processor to encode, for transmission via a set of multiple time-frequency resources and via a set of multiple spatial layers, a set of multiple code blocks associated with a codeword, where the set of multiple code blocks are encoded into a first subset of code blocks that are each to be transmitted using fewer than all of the set of multiple spatial layers and into a second subset of code blocks that are each to be transmitted using all spatial layers of the set of multiple spatial layers, each code block of all of the second subset of code blocks and some of the first subset of code blocks being encoded for transmission in multiple code block portions, each of the multiple code block portions associated with a respective code block being encoded for transmission in different time-frequency resources of the set of multiple time-frequency resources and across different spatial layers of the set of multiple spatial layers and transmit respective signals during corresponding time-frequency resources of the set of multiple time-frequency resources, each of the respective signals including one or more code blocks from the first subset of code blocks, one or more code blocks from the second subset of code blocks, or combinations thereof.

In some examples of the method, apparatuses, and non-transitory computer-readable medium described herein, the first subset of code blocks include a first quantity of information bits, and the second subset of code blocks include a second quantity of information bits that may be greater than the first quantity of information bits.

In some examples of the method, apparatuses, and non-transitory computer-readable medium described herein, encoding the set of multiple code blocks may include operations, features, means, or instructions for encoding information with a high priority into the first subset of code blocks based on the first subset of code blocks having a sequence known by a receiver.

In some examples of the method, apparatuses, and non-transitory computer-readable medium described herein, the information with the high priority corresponds to a MAC message, a high priority logical channel, a MAC header, a RLC header, a PDCP header, a TCP header, or any combination thereof.

Some examples of the method, apparatuses, and non-transitory computer-readable medium described herein may further include operations, features, means, or instructions for receiving, in response to the respective signals, a feedback message indicating a first acknowledgment feedback for the first subset of code blocks and a second acknowledgment feedback for the second subset of code blocks.

Some examples of the method, apparatuses, and non-transitory computer-readable medium described herein may further include operations, features, means, or instructions for encoding, in a middle portion of the codeword, at least one code block of the first subset of code blocks.

Some examples of the method, apparatuses, and non-transitory computer-readable medium described herein may further include operations, features, means, or instructions for encoding, in a middle portion of the codeword, a third subset of code blocks with a lower MCS than a MCS applied for the first subset of code blocks and the second subset of code blocks.

In some examples of the method, apparatuses, and non-transitory computer-readable medium described herein, encoding the set of multiple code blocks may include operations, features, means, or instructions for encoding the first subset of code blocks based on the first subset of code blocks including a zero-power signal.

Some examples of the method, apparatuses, and non-transitory computer-readable medium described herein may further include operations, features, means, or instructions for determining a size of a transport block corresponding to the codeword may be based on a quantity of time-frequency resources of the set of multiple time-frequency resources, a MCS for the codeword, and a quantity of code blocks in the second subset of code blocks.

In some examples of the method, apparatuses, and non-transitory computer-readable medium described herein, communicating control signaling indicating a mapping of the set of multiple code blocks to the set of multiple spatial layers across the set of multiple time-frequency resources, where the encoding may be based on the mapping.

Some examples of the method, apparatuses, and non-transitory computer-readable medium described herein may further include operations, features, means, or instructions for transmitting a first code block of the first subset of code blocks via a first spatial layer with a highest channel quality of the set of multiple spatial layers, where additional code blocks may be transmitted based on an ordering of the set of multiple spatial layers based on corresponding channel qualities.

Some examples of the method, apparatuses, and non-transitory computer-readable medium described herein may further include operations, features, means, or instructions for transmitting, via a first time-frequency resource of the set of multiple time-frequency resources, a first set of multiple portions of a first code block using a first subset of the set of multiple spatial layers and a second set of multiple portions of a second code block using a second subset of the set of multiple spatial layers.

DETAILED DESCRIPTION

Figure 1:
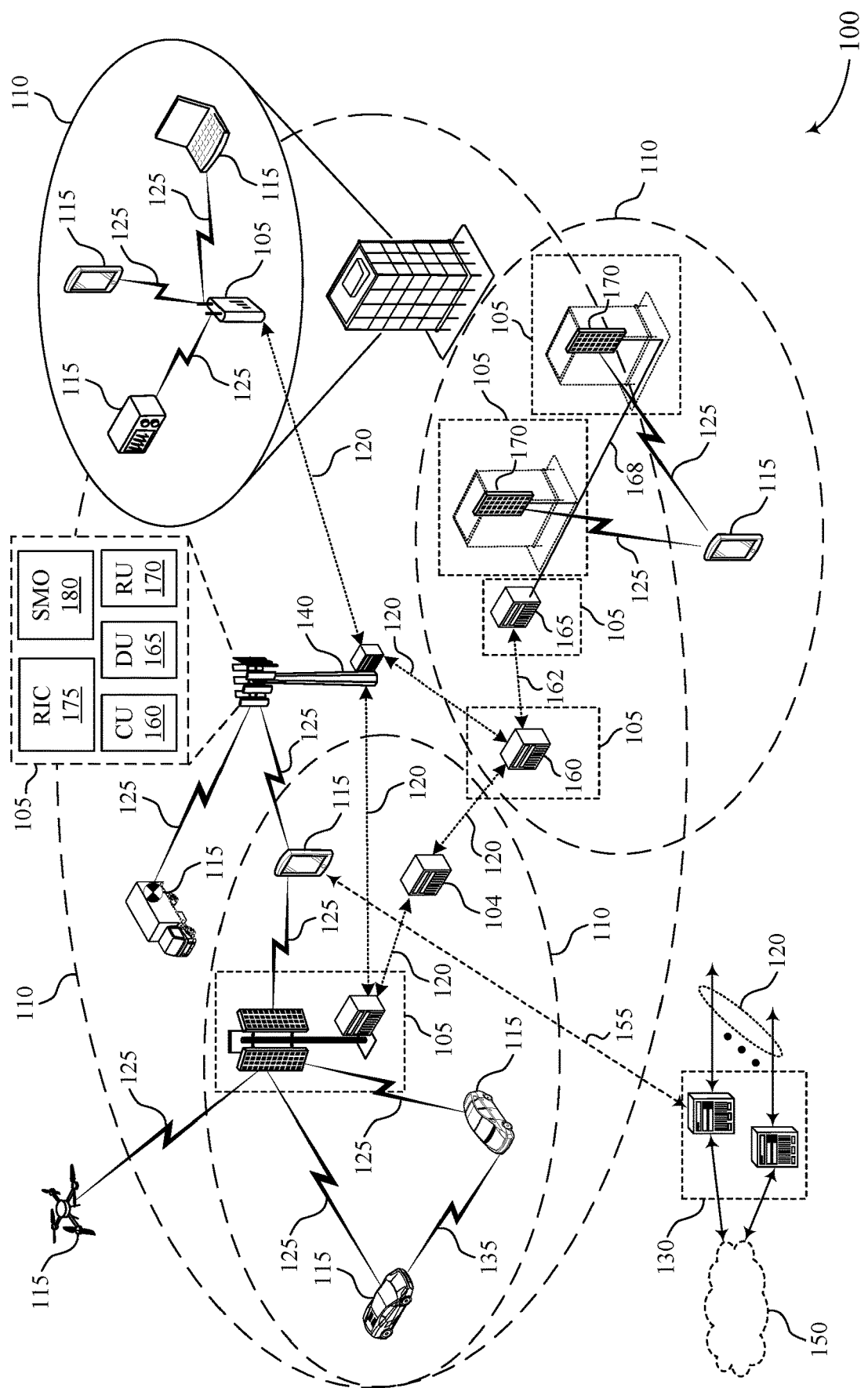
FIG. 1 illustrates an example of a wireless communications system that supports techniques for spatially coupled multiple-input multiple-output signaling in accordance with one or more aspects of the present disclosure.

In some wireless communications systems, one or more codewords (e.g., user data) may be partitioned into multiple code blocks. A transmitting wireless device may communicate the one or more codewords using a multiple-in, multiple-out (MIMO) structure such that code blocks of a codeword are mapped to multiple spatial layers (e.g., communicated using various antenna ports or demodulated reference signal (DMRS) ports of the wireless device) or multiple time-frequency resources. For instance, in some wireless communications systems (e.g., Long-Term Evolution (LTE) systems), different codewords may be mapped to different respective layers. For example, a wireless device operating in an LTE system may transmit multiple code blocks of a codeword using a single spatial layer over multiple time-frequency resources. In some other wireless systems (e.g., a fifth-generation New Radio (5G NR) system), a single codeword may be mapped to multiple layers. For example, a wireless device operating in an NR system may transmit different code blocks of a single codeword over multiple radio-frequency resources, in some cases using multiple spatial layers in a single time-frequency resource to transmit a same code block or repetitions of a code block. However, such techniques may incur significant signaling overhead (e.g., due to per-layer feedback signaling in an LTE system) or may reduce a receiver's ability to properly decode the codeword (e.g., due to nonlinear demodulation across multiple layers in an NR system).

The described techniques provide for spatially coupled MIMO signaling for a single codeword across multiple layers. A transmitting wireless device may map a same codeword to multiple layers and may map each code block of the codeword to the multiple layers in a staggered manner. For example, at a first time-frequency resource, each code block of a first set of code blocks may be mapped to a respective transmission layer. At a second time-frequency resource, each code block of a second set of code blocks may be mapped to a respective transmission layer, where the second set of code blocks is staggered from the first set of code blocks. That is, if the first set of code blocks includes code blocks 1 through 4, transmitted using four respective spatial layers, the second set of code blocks may include code blocks 2 through 5, such that code blocks 2, 3, and 4 are transmitted in both the first time-frequency resource and the second time-frequency resource, but code block 1 is only transmitted via the first time-frequency resource. By staggering code blocks across multiple time-frequency resources, a receiving wireless device may cancel out known information of one or more code blocks (e.g., decoded in a prior resource element, a known sequence of information, or the like), which may support decoding of an unknown code block (e.g., a first reception of a code block). Techniques are further provided for the handling of code blocks which are communicated using fewer than all of the spatial layers available for a device (e.g., referred to as special code blocks) as well as breaking decoding dependencies.

Aspects of the disclosure are initially described in the context of wireless communications systems. Aspects of the disclosure are further illustrated by and described with reference to shortened code block configurations, transmission configurations, and process flows. Aspects of the disclosure are further illustrated by and described with reference to apparatus diagrams, system diagrams, and flowcharts that relate to techniques for spatially coupled multiple-input multiple-output signaling.

FIG. 1 illustrates an example of a wireless communications system 100 that supports techniques for spatially coupled multiple-input multiple-output signaling in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c. F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for spatially coupled multiple-input multiple-output signaling as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IOT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking. Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some wireless communications systems, such as the wireless communications system 100, a transmitting wireless device (e.g., a network entity 105 or a UE 115) may transmit multiple data streams across respective spatial layers. For instance, a transmission configuration may include the transmission of multiple code blocks of a codeword (e.g., user data) using a single spatial layer over multiple time-frequency resources (e.g., an LTE system) or may include transmission multiple code blocks of a single codeword over multiple radio-frequency resources, in some cases using multiple spatial layers in a single time-frequency resource to transmit a same code block or repetitions of a code block (e.g., an NR system). However, such techniques may incur significant signaling overhead (e.g., due to per-layer feedback signaling in an LTE system) or may reduce a receiver's ability to properly decode the codeword (e.g., due to nonlinear demodulation across multiple layers in an NR system).

In some cases, to support spatially coupled MIMO signaling for a single codeword across multiple layers, a transmitting wireless device may communicate data in accordance with a staggered code block configuration. For example, at a first time-frequency resource, each code block of a first subset of the set of code blocks may be mapped to a respective transmission layer and at a second time-frequency resource, each code block of a second subset of the set of code blocks may be mapped to a respective transmission layer, where the second set of code blocks is staggered from the first set of code blocks (e.g., if the first set of code blocks includes code blocks 1 through 4, the second set of code blocks may include code blocks 2 through 5). By staggering code blocks across multiple time-frequency resources, a receiving wireless device may cancel out known information of one or more code blocks (e.g., decoded in a prior resource element, a known sequence of information, or the like), which may support decoding of an unknown code block (e.g., a first reception of a code block).

Figure 2:
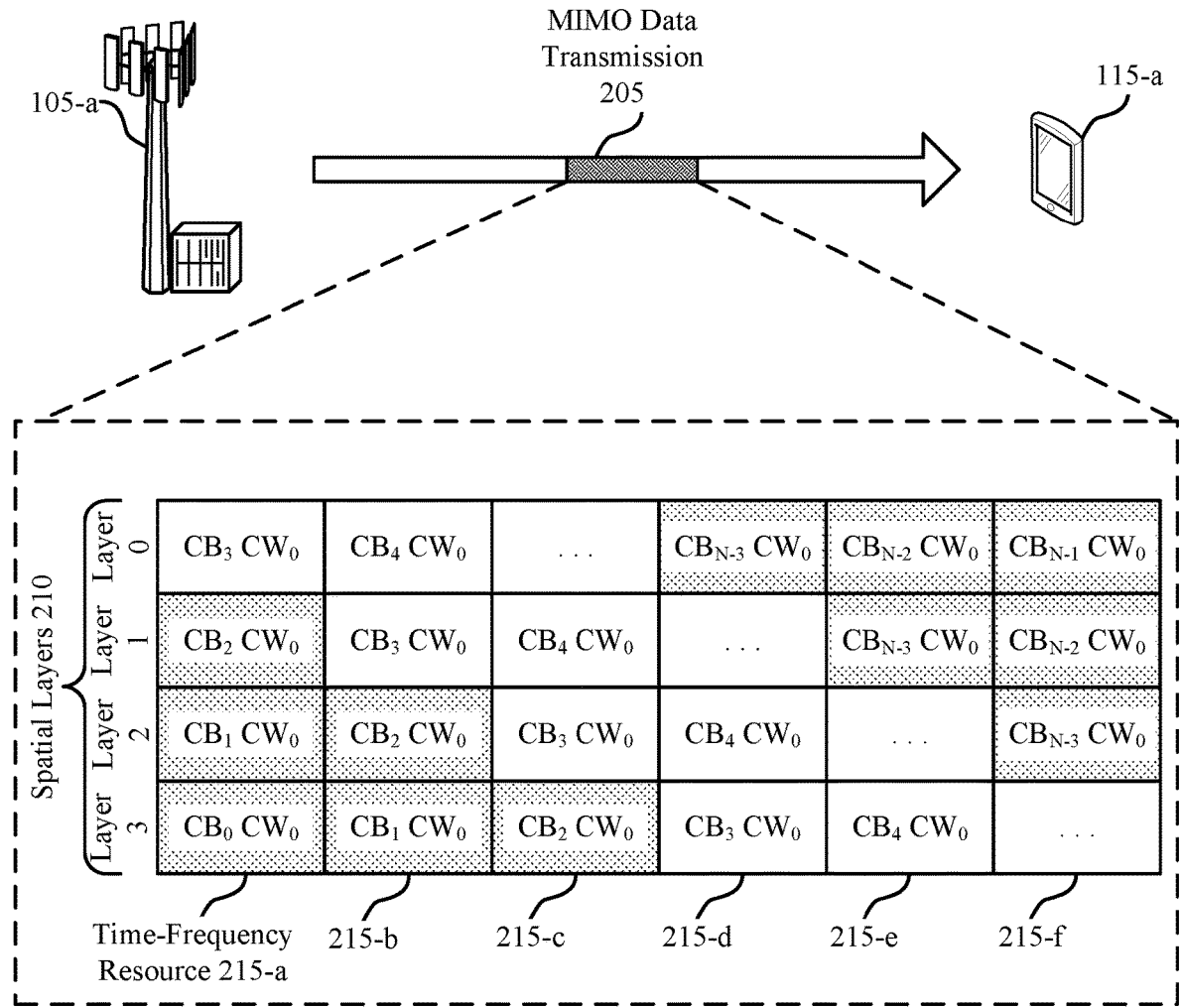
FIG. 2 illustrates an example of a wireless communications system that supports techniques for spatially coupled multiple-input multiple-output signaling in accordance with one or more aspects of the present disclosure.

FIG. 2 illustrates an example of a wireless communications system 200 that supports techniques for spatially coupled multiple-input multiple-output signaling in accordance with one or more aspects of the present disclosure. The wireless communications system 200 may implement one or more aspects of the wireless communications system 100. For example, the wireless communications system 200 may include a network entity 105-a and a UE 115-a, which may be respective examples of a network entity 105 and a UE 115 as described with reference to FIG. 1. In some cases, the wireless communications system 200 may depict the network entity 105-a and the UE 115-a communicating a MIMO data transmission 205, which may be an example of data that is communicated using multiple spatial layers 210 via one or more time-frequency resources 215.

In some cases, MIMO communications may be performed according to a multiple-codeword design structure, such as in an LTE system. For example, a transmitting device (e.g., the network entity 105-a) may assign a first codeword and a second codeword with different modulation and coding schemes (MCSs) and may map the first codeword and second codeword to respective spatial layers (e.g., such that hard successive interference cancellation (SIC) may be applied). The multiple-codeword MIMO design structure may support a relatively large channel capacity associated with MIMO and may enable relatively simple decoding by a receiver (e.g., linear minimum mean square error (LMMSE) estimation and SIC). Such techniques, however, may incur greater signaling overhead. For example, to support the multiple-codeword MIMO design structure, the transmitting device and a receiving device (e.g., the UE 115-a) may communicate signaling associated with each codeword, each layer, or both relatively frequently (e.g., a per-codeword channel quality index (CQI), separate feedback messages for different codewords and different layers, or both).

Additionally, or alternatively, MIMO communications may be performed according to a single codeword design with an irregular low-density parity check (LDPC) code. For example, the transmitting device may map a first codeword to multiple spatial layers. The receiving device may perform a non-linear MIMO demodulation (e.g., maximum-likelihood decoding, sphere decoding, or the like) or may perform an iterative demodulation and decoding across the multiple spatial layers. In such a single codeword design, different LDPC degree profiles may be used for different channels of a same capacity. Accordingly, signaling overhead may be mitigated (e.g., due to communicating MIMO data without layer-specific rate control and separate feedback signaling per layer). However, the complexity of a non-linear or iterative reception process may limit reception capabilities of some receivers to achieve a better MIMO communication performance.

The described techniques provide for MIMO communications which mitigate signaling overhead while supporting relatively low-complexity receivers by using a staggered code block configuration for signaling of a single codeword across multiple layers. In some cases, the transmitting device may communicate multiple code blocks (e.g., a set of N code blocks including $CB_0$ through $CB_{N-1}$) associated with a same codeword (e.g., a codeword $CW_0$) across multiple spatial layers 210 and multiple time-frequency resources 215. The spatial layers 210 may include one or more layers (e.g., a layer 0, a layer 1, a layer 2, and a layer 3), each of which may correspond to an antenna element or group of antenna elements of the transmitting device. It should be noted that the transmitting device and the receiving device may include any quantity of antenna elements or spatial layers and are not limited to the quantity depicted in and described with reference to the wireless communications system 200.

The transmitting device may map the codeword $CW_0$ to span each layer of the spatial layers 210. In some examples, the transmitting device may select an MCS to assign to the codeword $CW_0$ based on an average channel quality across the spatial layers 210. The transmitting device may additionally map each code block of the codeword $CW_0$ to the spatial layers 210 in a staggered manner (e.g., with respect to sequential time-frequency resources 215), such that on any time-frequency resource, different code blocks are mapped to different layers. Additionally, or alternatively, the staggering configuration may define that respective portions of each code block are communicated via respective ones of the time-frequency resources 215. For example, the transmitting device may map a first set of code blocks to the spatial layers 210 at a time-frequency resource 215-a. For example, the transmitting device may map a code block $CB_0$ to layer 3, a code block $CB_1$ to layer 2, a code block $CB_2$ to layer 1, and a code block $CB_3$ to layer 0 for the time-frequency resource 215-a. In some examples, a first portion of some of the code blocks may be mapped for the time-frequency resource 215-a. For example, a first portion of $CB_1$, a first portion of $CB_2$, and a first portion of $CB_3$ may be transmitted using respective spatial layers via the time-frequency resource 215-a. In some examples, an entirety of some of the code blocks, or an entirety of transmitted information for the code blocks, may be transmitted using one or more layers of the time-frequency resource 215-a. For example, $CB_0$ may be transmitted using spatial layer 3 via time-frequency resource 215-a.

The transmitting device may map a second set of code blocks to the spatial layers 210 at a time-frequency resource 215-b, where the code blocks of $CW_0$ are staggered across the time-frequency resources. For example, the transmitting device may map the code block $CB_1$ to layer 3, the code block $CB_2$ to layer 2, the code block $CB_3$ to layer 1, and a code block $CB_4$ to layer 0. In some cases, some of the code blocks mapped for the time-frequency resource 215-*b* (e.g., $CB_1$, $CB_2$, and $CB_3$) may represent a second portion of a code block that was mapped for the time-frequency resource 215-*a*. For example, a first portion of a code block may be transmitted using a first spatial layer and via a first set of time-frequency resources 215, and a second portion of the same code block may be transmitted using a second spatial layer and via a second set of time-frequency resources (e.g., that are different from the first spatial layer and first set of time-frequency resources).

The transmitting device may continue to stagger transmitted sets of code blocks across each of the time-frequency resources 215 (e.g., the time-frequency resource 215-*a*, the time-frequency resource 215-*b*, a time-frequency resource 215-*c*, a time-frequency resource 215-*d*, a time-frequency resource 215-*e*, and a time-frequency resource 215-*f*) such that each portion of each code block of the codeword $CW_0$ (e.g., $CB_0$ through $CB_{N-1}$) is communicated at least once. By using a single codeword across the spatial layers 210, communications between the transmitting device and the receiving device may have increased robustness against CSI mismatch, CSI aging, or the like (e.g., due to not communicating per-layer CQI).

In some cases, the receiving device may decode the code blocks through successive cancellation. For instance, due to the staggered configuration, the receiving device may assume a decoding result of code blocks $CB_0$ through $CB_{X-1}$ when decoding a code block $CB_X$. Thus, the receiving device may cancel interference associated with the code blocks $CB_0$ through $CB_{X-1}$ to support successful decoding of the code block $CB_X$. The cancellation of prior code block interference may allow the receiving device to use a relatively simple LMMSE demodulator for each layer of interest of the spatial layers 210 while achieving a relatively high channel capacity of MIMO communications. Such properties may support reliable MIMO communications as a quantity of the spatial layers 210 increases (e.g., an eight-layer MIMO design).

As an example of successive cancellation, the receiving device may first decode the code block $CB_0$ using the LMMSE demodulator on layer 3 of the spatial layers 210 at the time-frequency resource 215-*a*. Following the decoding of the code block $CB_0$, the receiving device may cancel interference associated with the code block $CB_0$ to support demodulation and decoding of the code block $CB_1$. The receiving device may continue to decode subsequent code blocks via the cancellation of prior code blocks (e.g., decoding code block $CB_2$ by cancelling $CB_1$ and $CB_0$, decoding code block $CB_3$ by cancelling $CB_2$, $CB_1$, and $CB_0$, and so on). Thus, upon receiving a signal via the time-frequency resource 215-*b* (e.g., including a new code block $CB_4$), the receiver may decode the code block $CB_4$ using the LMMSE demodulator on layer 0 of the spatial layers 210 and based on cancelling interference associated with the code blocks $CB_1$, $CB_2$, and $CB_3$.

In some examples, one or more code blocks may be received using fewer than all of the spatial layers available for a wireless device (e.g., related to antenna ports or DMRS ports of the wireless device). For example, the code block $CB_0$ may be received by the receiving device using only the antenna element associated with layer 3 of the spatial layers 210. Similarly, the code block $CB_1$, the code block $CB_2$, the code block $CB_{N-3}$, the code block $CB_{N-2}$, and the code block $CB_{N-1}$ may be examples of code blocks received using fewer than all of the spatial layers available for the receiving device. Such code blocks may be referred to as special code blocks 220. Additionally, code blocks received using each antenna element of the receiving device (e.g., the code block $CB_3$ and the code block $CB_4$) may be referred to as regular code blocks 225. In some examples, the special code blocks 220 may be received, in the time domain, the frequency domain, or both, at a beginning or an end, or both, of the time-frequency resources used to communicate the codeword.

The transmitting device and the receiving device may communicate the special code blocks 220 using techniques that are different from techniques for communicating regular code blocks 225 (e.g., due to a lack of prior decoding to apply successive cancellation). In a first example, the transmitting device may transmit a known signal via the special code blocks 220. For example, the transmitting device may transmit a set of known bits via the special code blocks 220 (e.g., to support cancellation without decoding the special code blocks 220) or may transmit a zero-power signal via the special code blocks 220 (e.g., eliminating interference associated with the special code blocks 220). In some cases, the transmission of known signals via special code blocks 220 may incur a rate loss for the communications. That is, if a MIMO communication design includes L layers and M code blocks, a rate loss of $$\frac{L-1}{M}$$

may be associated with the transmission of known signals via the special code blocks 220. However, such a rate loss may be mitigated as a quantity of code blocks increases (e.g., a larger quantity of code blocks supported by enhanced cellular standards). In a second example, special code blocks 220 may be communicated as shortened code blocks, as further described herein with reference to FIG. 3. In a third example, the special code blocks 220 may be communicated using a same coding rate as the regular code blocks 225 and with a smaller code block size. In some examples, special code blocks 220 that are communicated at a beginning or end, or both, of the MIMO data transmission 205 may be communicated using techniques that are different from techniques used for communicating other special code blocks 220.

In some examples, the receiving device may transmit feedback messages to indicate a reception status of the code blocks (e.g., a HARQ acknowledgment (HARQ-ACK) or a HARQ negative acknowledgment (HARQ-NACK)). Additionally, the receiving device and transmitting device may communicate feedback for the special code blocks 220 and the regular code blocks 225 via different respective feedback messages. For example, the receiving device may indicate whether one or more special code blocks 220 have been successfully received via a first HARQ feedback message and may indicate whether one or more regular code blocks 225 have been received via a second HARQ feedback message. Accordingly, the transmitting device may perform retransmissions of special code blocks 220 and regular code blocks 225 (e.g., upon receiving a respective HARQ-NACK) as separate respective messages. In some cases, the receiving device may transmit a single feedback message (e.g., a one-bit HARQ feedback message) indicating a reception status of each of the special code blocks 220 and the regular code blocks 225.

In some cases, a processing latency at the receiving device may be affected based on the special code blocks 220. For example, the processing latency may change based on how the special code blocks 220 are handled. For instance, when special code blocks 220 are transmitted as known signals, a latency for processing a transport block (TB) corresponding to a codeword using spatially coupled code block mappings (e.g., the codeword $CW_0$) may be similar to a latency for processing a TB corresponding to a codeword using non-coupled code block mappings. If special code blocks 220 are transmitted as shortened code blocks, the receiving device may experience additional latency due to the staggered configuration. In some examples, if the special code blocks 220 are transmitted as shortened (e.g., information-carrying) code blocks, the receiving device may refrain from decoding the code blocks $CB_{N-3}$, $CB_{N-2}$, and $CB_{N-1}$ before receiving the entire transmission. In some examples, both spatially coupled code block mappings and non-coupled code block mappings may be used for different data transmissions communicated between the transmitting device and the receiving device. In such examples, a processing time for transmissions using the spatially coupled code blocks may be greater than a processing time for transmissions using the non-coupled code block mappings (e.g., an increase of D OFDM symbols with respect to a decoding time for transmissions using the non-coupled code block mappings). For example, a processing time for a transmission encoded in accordance with the staggered mapping techniques (e.g., spatially coupled MIMO techniques) may be greater than a processing time for a transmission which does not use the staggered mapping techniques. In some cases, at the transmitting device, the processing time may denote a duration between receiving a grant for the transmission and transmission of the MIMO data transmission 205 (e.g., a time to prepare the transmission). In some cases, at the receiving device, the processing time may denote a duration between reception of the MIMO data transmission 205 and transmission of feedback associated with the MIMO data transmission 205 (e.g., a time to receive and decode the transmission).

In some examples, a transmitting device may determine a size for a TB based on the special code blocks 220 and the regular code blocks 225. For example, the size of the TB to be transmitted in accordance with spatially-coupled MIMO codewords may be based on how the special code blocks 220 are handled. The transmitting device may first determine an initial TB size, $A_1$, based on a quantity of resources allocated for transmission of the codeword (e.g., a quantity of time domain resources, a quantity of frequency resources, or a quantity of spatial resources, or any combination thereof) as well as an MCS of the codeword. In some cases, the initial TB size may be determined as though each code block associated with the code word were a regular code block 225. Using the initial TB size, the transmitting device may determine a quantity of code blocks, $B_1$, for the codeword based on a maximum code block size allowed for a channel code (e.g., 8448 for NR LDPC base graph 1 (BG1)). A code block size, K, may then be determined according to $$K = \frac{A_1}{B_1}.$$

In a spatially-coupled MIMO design, the transmitting device may determine a quantity of the regular code blocks 225, $B_2$, based on a quantity of layers used for communications, L, according to $B_2 = B_1 - (L-1)$.

In a first example, such as when special code blocks 220 are transmitted as known sequences of information, the final TB size, $A_2$, may be determined according to $A_2 = K*B_2 = A_1 - (L-1)K$. That is, since the special code blocks 220 do not convey information bits, the TB size may be represented as a product of the quantity of the regular code blocks 225 and the determined code block size. In a second example, such as when the special code blocks 220 are transmitted as shortened code blocks, the final TB size may be determined according to a different expression, as described further with reference to FIG. 3. In a third example, such as when the special code blocks 220 are transmitted using a same coding rate as the regular code blocks 225, the final TB size, $A_2$, may be equal to the initial TB size, $A_1$.

The transmitting device and the receiving device may identify an ordering of the spatial layers 210 for staggering code blocks prior to communicating the MIMO data transmission 205. For example, the staggering may be performed according to a pre-defined ordering, such as a sequential ordering (e.g., mapping a first code block to layer 0, then a second code block to layer 1, followed by layer 2, followed by layer 3) or a reverse ordering (e.g., layer 3, followed by layer 2, followed by layer 1, followed by layer 0). Additionally, or alternatively, the ordering may be indicated via signaling between the transmitting device to the receiving device (e.g., from the network entity 105-a to the UE 115-a). In some examples, the transmitting device may determine a precoder such that the spatial layers 210 are ordered by strength (e.g., channel quality). For instance, for a reverse ordering, the transmitting device may set the strength of each layer to follow the reverse ordering (e.g., layer 3 having a strongest channel quality and layer 0 having a weakest channel quality). Accordingly, the receiving device may decode a strongest layer first, and may decode subsequent layers in order of layer strength.

Figure 3:
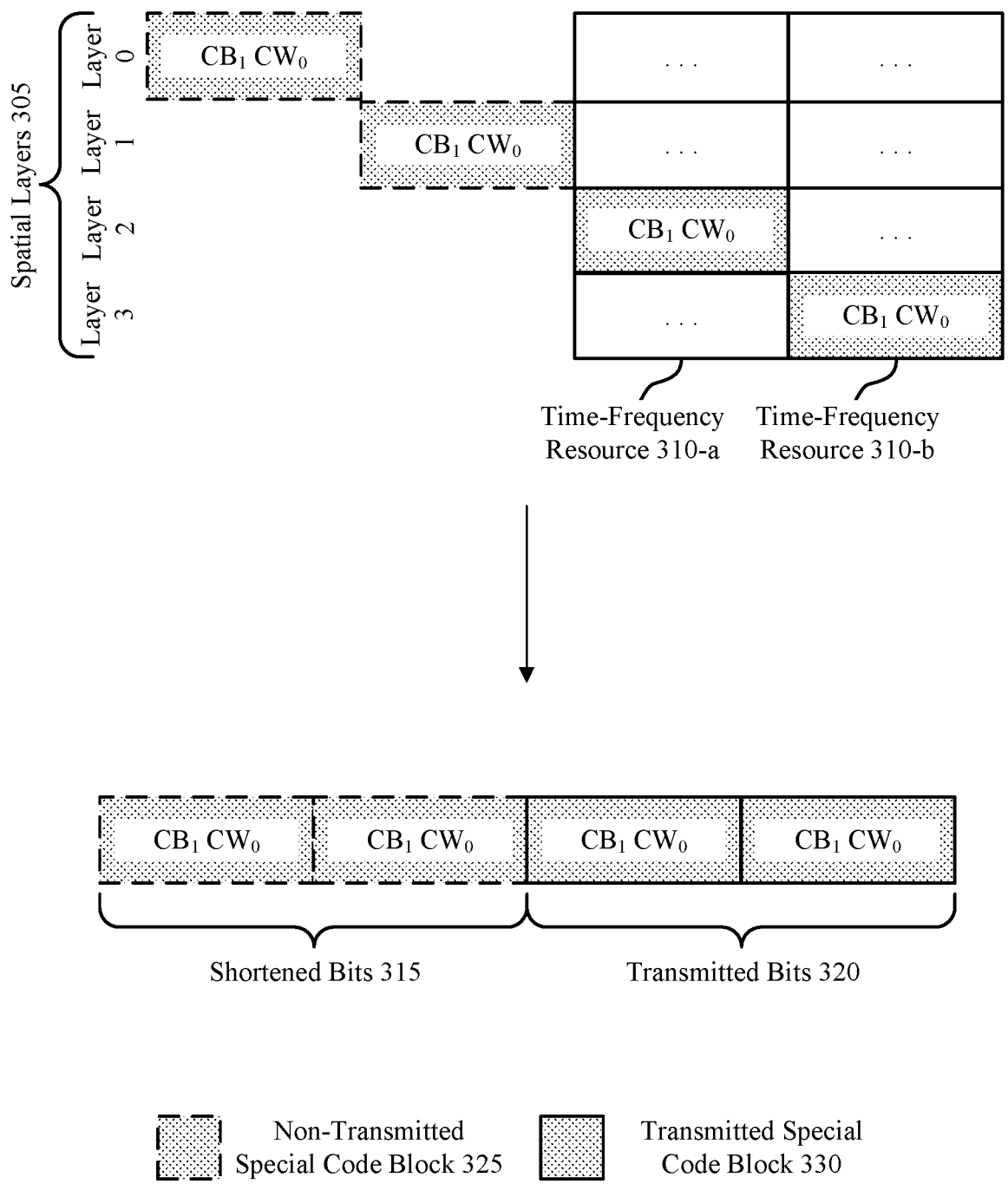
FIG. 3 illustrates an example of a shortened code block configuration that supports techniques for spatially coupled multiple-input multiple-output signaling in accordance with one or more aspects of the present disclosure.

FIG. 3 illustrates an example of a shortened code block configuration 300 that supports techniques for spatially coupled multiple-input multiple-output signaling in accordance with one or more aspects of the present disclosure. The shortened code block configuration 300 may be implemented by one or more aspects of the wireless communications system 200. For example, the shortened code block configuration 300 may be an example of techniques for communicating special code blocks 220, as described with reference to FIG. 2. Specifically, the shortened code block configuration 300 may depict techniques for communicating a special code block (e.g., the code block $CB_1$) as a shortened code block.

In some cases, a special code block may be staggered across multiple spatial layers 305 according to a spatially-coupled MIMO design. In some examples, a special code block may be configured, implemented, or considered as a shortened code block. For example, one or more instances of the special code block may not be transmitted, as the one or more instances of the special code block may include shortened, or zeroed, bits. That is, if a staggering configuration includes an instance of the special code block for each respective layer of the spatial layers 305, the special code block may be ordered such that a data transmission including the special code block begins after a start of the ordering (e.g., using fewer than all of the spatial layers 305). For example, a first instance of a special code block $CB_1$ may be transmitted via layer 2 of a time-frequency resource 310-a and a second instance of the special code block $CB_1$ may be transmitted via layer 3 of a time-frequency resource 310-b, despite the staggering configuration defining four instances of the special code block $CB_1$.

To handle communication of the special code block $CB_1$, the transmitting device may partition the instances of the special code block $CB_1$ into a group of shortened bits 315 and a group of transmitted bits 320. In some cases, the transmitting device may identify a length of a regular code block, N, and may identify a quantity of information bits associated with the regular code block, K. The transmitting device may allocate a quantity of resources for a special code block such that the special code block conveys a quantity of L bits. The quantity L may be defined as a quantity of transmitted special code blocks 330 divided by the quantity of layers in the spatial layers 305 and multiplied by the length of a regular code block, N. For instance, the special code block $CB_1$ may be allocated a quantity of information bits according to $$L = \frac{2N}{4}$$

(e.g., including two transmitted special code blocks 330 and two non-transmitted special code blocks 325). In some examples, the transmitting device may designate N-L bits (e.g., bits not allocated to the special code block $CB_1$) as shortened bits 315, and may set the shortened bits 315 to be known bits (e.g., all zero bits). Such shortened bits 315 may be known to the receiving device and may not be transmitted by the transmitting device.

The transmitted bits 320 may include a quantity of information bits that is based on a quantity of bits included in the shortened bits 315. For example, if the quantity of information bits associated with the regular code blocks, K, is greater than the quantity of bits included in the shortened bits 315, N-L, the transmitting device may generate a quantity of information bits according to K-(N-L). The transmitting device may then jointly encode the generated quantity of information bits with the N-L shortened (e.g., zero) bits to generate a remaining quantity of N-K parity bits. Additionally, or alternatively, if the quantity of information bits associated with the regular code blocks, K, is less than or equal to the quantity of bits included in the shortened bits 315, N-L, the transmitting device may consider the information bits for the associated special code block to each be zero. For example, the remaining coded bits to be communicated via the associated special code block, L, may be communicated as zeros or zero bits.

In some examples, a reliability of a code block may be associated with whether the code block is a special code block or a regular code block. For example, a special code block that is communicated as a shortened code block may have a greater reliability than a regular code block (e.g., independent of individual channel conditions for each spatial layer 305) based on the shortened bits being known to the receiver, therefore improving SNR. For example, the bits may be considered as being communicated via a channel with an infinite SNR. Accordingly, upon reception of the shortened code block, the receiving device may begin performing the SIC for subsequent code blocks (e.g., other special code blocks and regular code blocks) with a high reliability. In some cases, the transmitting device may transmit high-priority or otherwise important information (e.g., meta data) via the special code blocks based on the special code blocks having a higher reliability. For example, the transmitting device may communicate a MAC control element (MAC-CE), one or more logical channels having relatively high priority, a MAC header, an RLC header, a PDCP header, a transmission control protocol (TCP) header, or any combination thereof via the special code blocks including shortened bits.

When determining a size of a TB associated with a codeword and using shortened special code blocks, the size may be related to a quantity of information bits included in each shortened special code block. For example, for a quantity of code blocks for the codeword, $B_1$, a code block size, K, a quantity of layers included in the spatial layers 305, L, and a quantity of coded bits for a regular code block, N, the final TB size, $A_2$, may be determined according to $$A_2 = KB_1 + 2\sum_{j=1}^{L-1}\max(0, K - \frac{jN}{L}).$$

In such an example, each of the shortened special code blocks communicated at a beginning or end, or both, of the data transmission may contain a quantity of information bits according to $$\Sigma_{j=1}^{L-1}\max(0, K - \frac{jN}{L})$$

(e.g., multiplied by two in the TB size equation due to symmetry).

Figure 4:
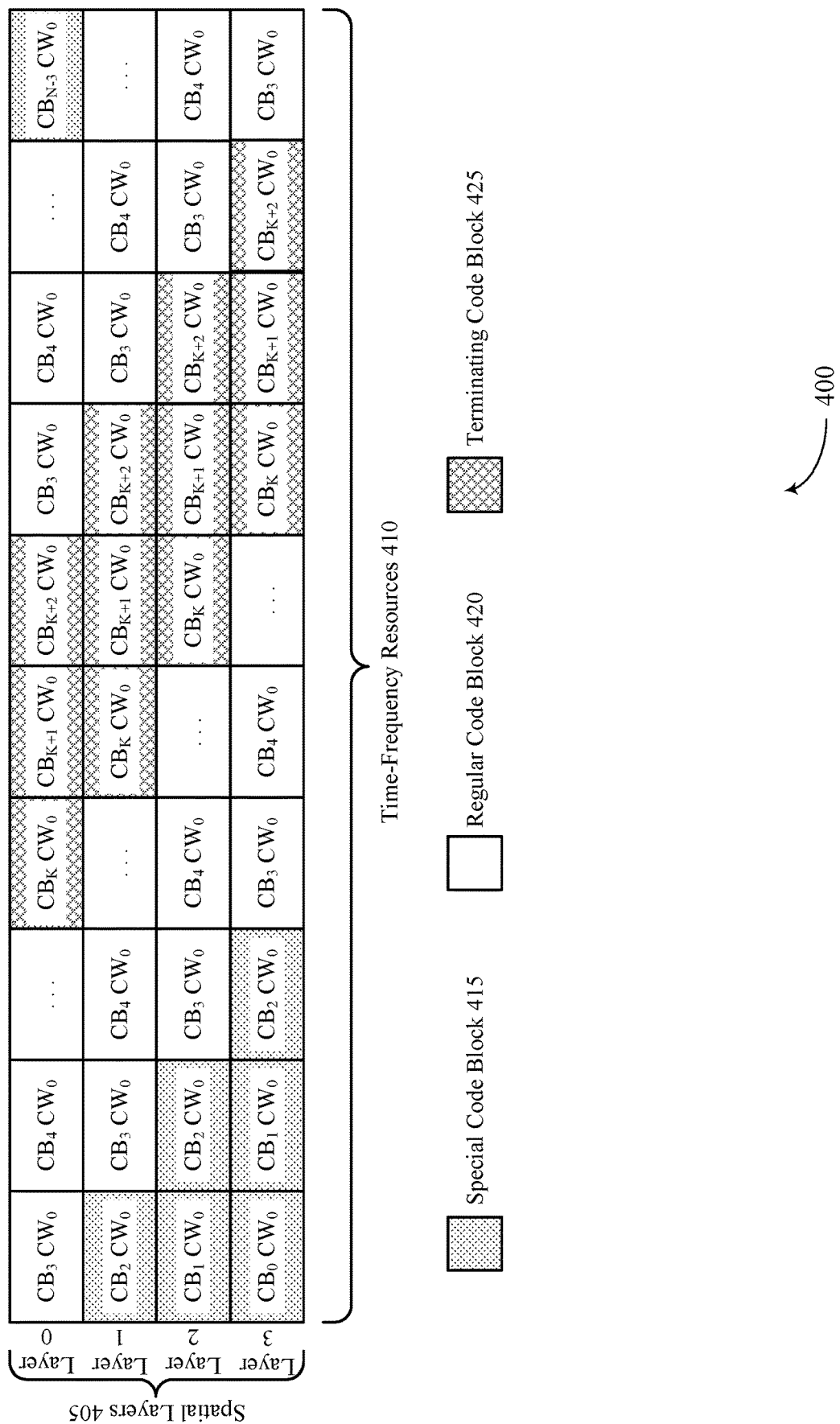
FIG. 4 illustrates an example of a transmission configuration that supports techniques for spatially coupled multiple-input multiple-output signaling in accordance with one or more aspects of the present disclosure.

FIG. 4 illustrates an example of a transmission configuration 400 that supports techniques for spatially coupled multiple-input multiple-output signaling in accordance with one or more aspects of the present disclosure. The transmission configuration 400 may implement one or more aspects of the wireless communications system 200. For example, the transmission configuration 400 may be an example of a MIMO data transmission 205 which includes a staggered code block configuration, as described with reference to FIG. 2. Further, the transmission configuration 400 may include a set of spatial layers 405 and time-frequency resources 410, which may be receptive examples of the spatial layers 210 and the time-frequency resource 215, as well as special code blocks 415 and regular code blocks 420, which may be respective examples of the special code blocks 220 and the regular code blocks 225, as described with reference to FIG. 2.

In some cases, communicating code blocks according to a staggered configuration may result in decoding dependencies for one or more of the code blocks. For example, decoding of a code block $CB_4$ via a first time-frequency resource 410 may be based on successful decoding of other code blocks $CB_3$, $CB_2$, and $CB_1$ via a prior time-frequency resource 410 (e.g., to allow for cancellation of interference associated with those code blocks). As such, if the receiving device fails to properly decode the prior code blocks, the receiving device may less reliably decode a current code block, which may further limit the receiving device's ability to decode subsequent code blocks.

In some cases, such as when HARQ feedback for an entire TB is used, the receiving device may transmit a HARQ-NACK to the transmitting device to indicate that each code block is to be retransmitted. In some other cases, such as when feedback is communicated at a higher granularity (e.g., code block group based feedback), feedback communication may incur a greater signaling overhead.

To support breaking dependencies when decoding a code block fails, the transmitting device may insert one or more terminating code blocks 425. In some examples, the terminating code blocks 425 may be examples of additional special code blocks 415 which are included in additional portions of the codeword, such as in the middle of the time-frequency resources 410. By including the terminating code blocks 425 as special code blocks 415, the receiving device may decode the terminating code blocks 425 to restart the staggering configuration (e.g., using techniques for handing special code blocks 415 as described with reference to FIGS. 2 and 3). Additionally, or alternatively, the transmitting device may communicate the terminating code blocks 425 using a different MCS than the special code blocks 415 and the regular code blocks 420. For example, the transmitting device may select a lower MCS for transmission of the terminating code blocks 425 such that the receiving device may more reliably decode the terminating code blocks 425 (e.g., without using successive cancellation of prior code blocks).

In some examples, the transmitting device and the receiving device may configure HARQ feedback communications to facilitate retransmission while mitigating signaling overhead. For example, the receiving device may report, to the transmitting device, an index of a first code block associated with a decoding error (e.g., $CB_K$). The transmitting device may then retransmit the reported code block as well as each sequential code block following the reported code block (e.g., $CB_K$ through $CB_{N-1}$). In some cases, such feedback signaling may correspond to a signaling overhead of $\log_2(1+M)$ bits per TB, where M may represent a maximum quantity of code blocks associated with a TB. In some other cases, the receiving device may report an index of a code block group including a first code block associated with a decoding error, which may correspond to a signaling overhead of $\log_2(1+M_{CBG})$ bits per TB, where $M_{CBG}$ may represent a maximum quantity of code block groups associated with a TB.

Additionally, or alternatively, the receiving device may begin decoding the data transmission from both a start of the transmission and an end of the transmission (e.g., due to special code blocks 415 being included at both the start and end of the transmission). In some examples, the receiving device may report, to the transmitting device, a respective index of a code block associated with a decoding error from the front end of the transmission (e.g., relative to the time-frequency resources 410), the back end of the transmission, or both. The transmitting device may retransmit code blocks including the code block reported from the front end of the transmission to the code block reported from the back end of the transmission (e.g., a set of code blocks in the middle of the transmission). By decoding code blocks from either end of the transmission, the receiving device may encounter a decoding failure from the front end on a code block $CB_j$ (stopping decoding from the front end), but may successfully decode the code block $CB_j$ while decoding from the back end. In such a case, the receiving device may report a HARQ-ACK for the code block $CB_j$ (e.g., a special codepoint).

Figure 5:
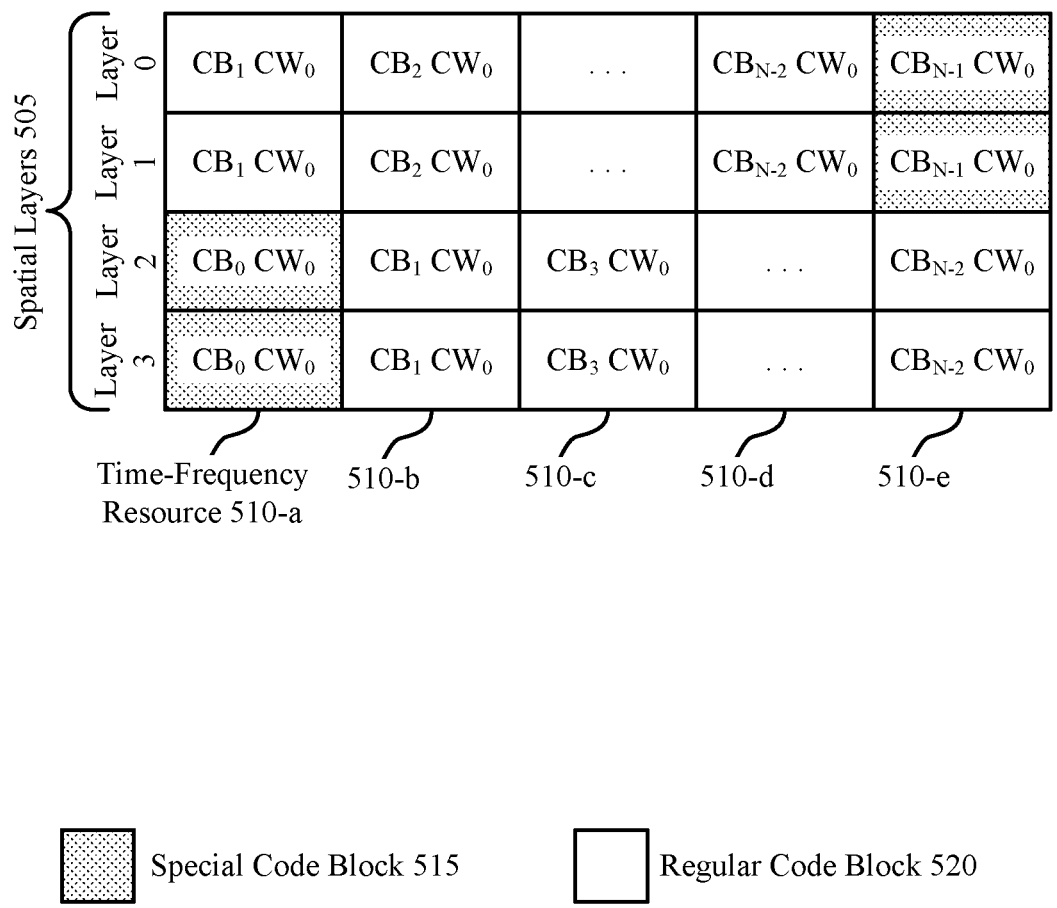
FIG. 5 illustrates an example of a transmission configuration that supports techniques for spatially coupled multiple-input multiple-output signaling in accordance with one or more aspects of the present disclosure.

FIG. 5 illustrates an example of a transmission configuration 500 that supports techniques for spatially coupled multiple-input multiple-output signaling in accordance with one or more aspects of the present disclosure. The transmission configuration 500 may implement one or more aspects of the wireless communications system 200. For example, the transmission configuration 500 may be an example of a MIMO data transmission 205 which includes a staggered code block configuration, as described with reference to FIG. 2. Further, the transmission configuration 500 may include a set of spatial layers 505 and time-frequency resources 510, which may be receptive examples of the spatial layers 210 and the time-frequency resource 215, as well as special code blocks 515 and regular code blocks 520, which may be respective examples of the special code blocks 220 and the regular code blocks 225, as described with reference to FIG. 2.

In some cases, a staggering configuration for code blocks of a spatially-coupled MIMO transmission may be defined for multiple layers of the spatial layers 505. For example, the code block $CB_1$ may be transmitted via both of a layer 0 and a layer 1 of the spatial layers 505 at a time-frequency resource 510-a, and the code block $CB_1$ may be transmitted via both of a layer 2 and a layer 3 of the spatial layers 505 at a time-frequency resource 510-b. Such multi-layer staggering may be applicable to the techniques described with reference to FIGS. 2, 3, and 4, where considerations associated with a quantity of layers (e.g., the variable L in the determination of a TB size) may instead use a quantity of staggered stages. In some examples, the receiving device may perform LMMSE estimation, non-linear demodulation (e.g., maximum likelihood demodulation or sphere decoding), or both on a set of layers of interest, and may perform SIC on previously decoded layers. For example, for a code block $CB_0$, the receiving device may perform a non-linear demodulation procedure (e.g., a maximum likelihood demodulation or near-maximum likelihood demodulation) on layer 2 and layer 3 of the spatial layers 505 at the time-frequency resource 510-a and may decode the code block $CB_0$. Following the decoding of $CB_0$, the receiving device may perform a non-linear demodulation procedure on layer 1 and layer 0 of the spatial layers 505 to support decoding of a code block $CB_1$ at a time-frequency resource 510-b. The receiving device may perform similar procedures for decoding, successively, subsequent code blocks at the time-frequency resource 510-c, the time-frequency resource 510-d, and the time-frequency resource 510-c.

Figure 6:
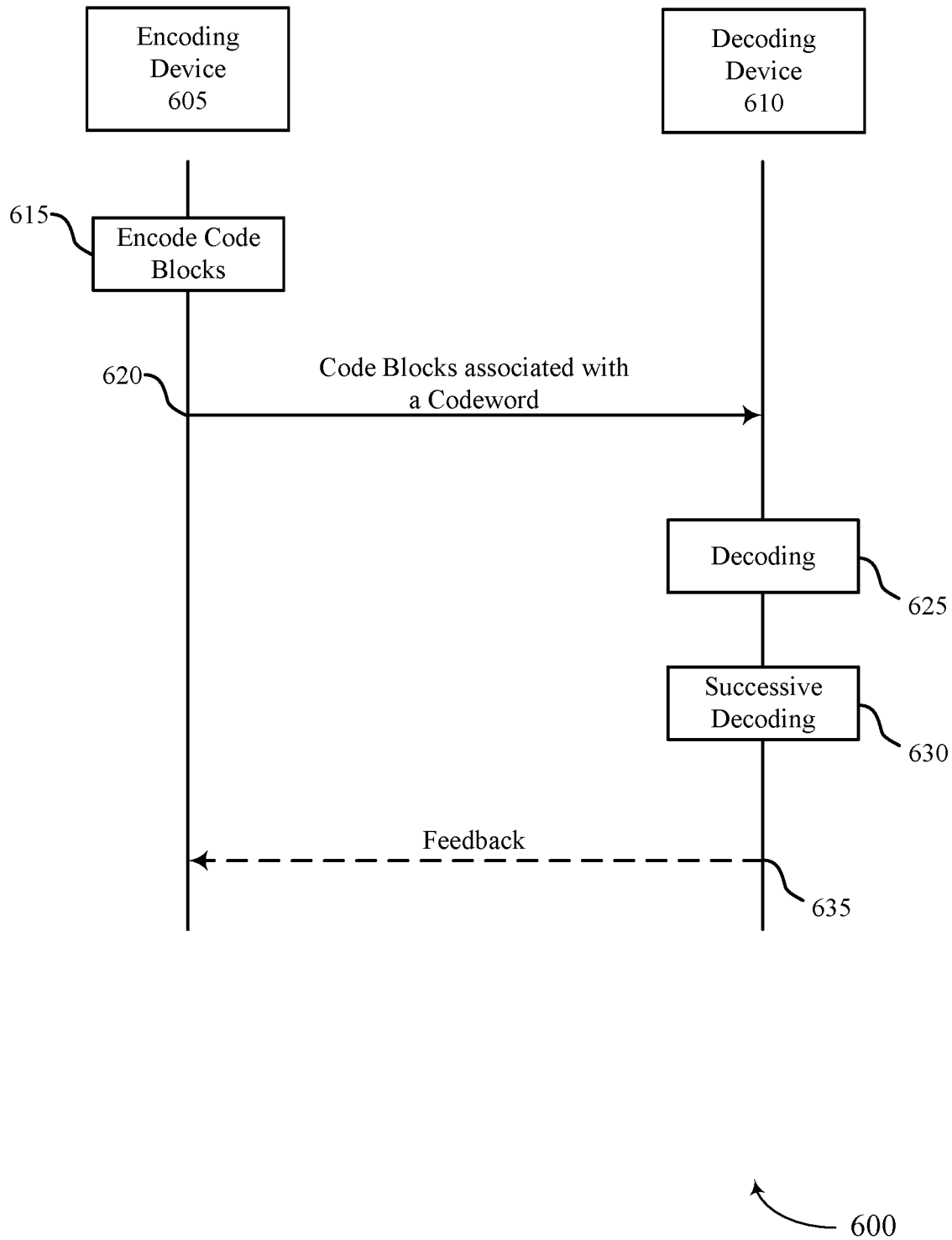
FIG. 6 illustrates an example of a process flow that supports techniques for spatially coupled multiple-input multiple-output signaling in accordance with one or more aspects of the present disclosure.

FIG. 6 illustrates an example of a process flow 600 that supports techniques for spatially coupled multiple-input multiple-output signaling in accordance with one or more aspects of the present disclosure. The process flow 600 may be implemented by an encoding device 605 or a decoding device 610, or both. The encoding device 605 may be an example of transmitting device, a UE 115, or a network entity 105 as described with reference to FIG. 1. The decoding device 610 may be an example of a receiving device, a UE 115, or a network entity 105 as described with reference to FIG. 1. In some examples, some signaling or processes of the process flow 600 may occur in a different order than shown. Additionally, or alternatively, some signaling or processes shown may not occur, or some signaling or processes not shown may occur, or both.

At 615, the encoding device 605 may encode a set of code blocks associated with a codeword in accordance with the spatially coupled MIMO signaling technique described herein. For example, the encoding device 605 may encode, for transmission via a set of multiple time-frequency resources and via a set of multiple spatial layers, the set of code blocks associated with the codeword. The set of code blocks may be encoded into a first subset of code blocks that are each to be transmitted using fewer than all of the set of multiple spatial layers and into a second subset of code blocks that are each to be transmitted using all spatial layers of the set of multiple spatial layers. All of the second subset of code blocks and some of the first subset of code blocks may be encoded for transmission across multiple time-frequency resources of the set of multiple time-frequency resources. In an example, the set of code blocks may be encoded to be staggered across the multiple-time frequency resources, as described with reference to FIGS. 2 through 5. In some examples, code blocks of the first subset of code blocks may be examples of special code blocks described herein, and code blocks of the second subset of code blocks may be examples of regular code blocks described herein.

At 620, the encoding device 605 may transmit the code blocks associated with the codeword to the decoding device 610. For example, the encoding device 605 may transmit respective signals during corresponding time-frequency resources of the set of multiple time-frequency resources. In some examples, each of the respective signals may include one or more code blocks from the first subset of code blocks, one or more code blocks from the second subset of code blocks or combinations thereof.

The decoding device 610 may receive the code blocks associated with the codeword. For example, the decoding device 610 may receive, via the set of multiple time-frequency resources, the set of code blocks associated with the codeword, where the set of code blocks includes the first subset of code blocks that are each received using fewer than all of the set of multiple spatial layers and the second subset of code blocks that are each received using all spatial layers of the set of multiple spatial layers. In some examples, all of the second subset of code blocks and some of the first subset of code blocks may be received across multiple time-frequency resources of the set of multiple time-frequency resources. For example, each code block of the second subset of code blocks and some of the first subset of code blocks may be received in multiple code block portions, where each of the multiple code block portions associated with a respective code block being received in different time-frequency resources of the set of multiple time-frequency resources and across different spatial layers of the set of multiple spatial layers.

At 625, the decoding device 610 may decode a first code block of the first subset of code blocks based on the first code block having a known sequence. For example the first code block may be an example of a special code block, which may include at least partially known information. For example, the first code block may include a known sequence (e.g., a sequence known to both the encoding device 605 and the decoding device 610). In some examples, the first code block may include a set of known bits, or the encoding device 605 may transmit the first code block including a zero-power signal.

At 630, the decoding device 610 may successively decode additional code blocks based on cancellation of known information. For example, the decoding device 610 may decode, successively, additional code blocks of the first subset of code blocks or the second subset of code blocks, or both, based on cancellation of at least one of the first code block or other previously decoded code blocks of the set of code blocks from a respective signal associated with a corresponding one of the additional code blocks and received during a corresponding time-frequency resource of the set of multiple time-frequency resources. In an example, the decoding device 610 may cancel information of the first code block from a signal including both the first code block and a second code block. The decoding device 610 may then more reliably decode the second code block based on cancelling the information from the first code block. When the second code block is decoded, any interference from the first code block and the second code block may be canceled out from additional signals including the first code block or the second code block to decode additional, unknown code blocks.

In some examples, the encoding device 605 may include higher priority information in the code blocks of the first subset of code blocks, or the special code blocks. For example, the code blocks of the first subset of code blocks may include information with high priority, such as a MAC message (e.g., a MAC-CE), a high priority logical channel, a PDCP header, a TCP header, or any combination thereof.

In some examples, the encoding device 605 and the decoding device 610 may communicate the set of code blocks using a same ordering of layers in which the staggering occurs. In some examples, the staggering may occur according to a pre-defined order. For example, a first code block (e.g., $CB_0$) may be transmitted on a first layer (e.g., Layer 0), a second code block (e.g., $CB_1$) may be transmitted on a second layer (e.g., Layer 1), and so on. In some examples, the ordering of the layers may be signaled from the transmitter to the receiver. For example, the encoding device 605 may indicate, to the decoding device 610, an ordering of the layers for staggering the code blocks associated with the codeword. In some examples, the encoding device 605 may select a precoder such that the determined stagger order satisfies that the strongest layer (e.g., in terms of channel quality) is decoded first. In the example above, the encoding device 605 may select a precoder such that Layer 0 has a highest channel quality, and Layer 3 has a lowest channel quality.

In some examples, the encoding device 605 may include one or more termination code blocks with transmission of the set of code blocks associated with the codeword. For example, the encoding device 605 may insert special code blocks in the middle of the set of multiple time-frequency resources to terminate and restart the staggering of the set of code blocks. Additionally, or alternatively, the encoding device 605 may include code blocks with a different MCS (e.g., a lower MCS) in the middle of the time-frequency resources, such that the code blocks with the different MCS can be decoded without using SIC or cancellation.

In some examples, the decoding device 610 may transmit a feedback message to the encoding device 605 for the set of code blocks associated with the codeword at 635. In some examples, the decoding device 610 may transmit feedback for the entire set of code blocks or for the complete codeword. For example, the decoding device 610 may indicate a HARQ-ACK if the set of codewords are successfully decoded or a HARQ-NACK if the set of codewords are unsuccessfully decoded. In some other examples, the first subset of code blocks (e.g., the special code blocks) and the second set of code blocks (e.g., the regular code blocks) may have separate HARQ feedback. For example, the decoding device 610 may transmit the feedback message indicating a first acknowledgment feedback (e.g., HARQ-ACK or HARQ-NACK) for the first subset of code blocks and a second acknowledgment feedback (e.g., HARQ-ACK or HARQ-NACK) for the second subset of code blocks.

In some examples, the feedback message may indicate an index of a first code block resulting in a decoding error. For example, the decoding device 610 may transmit the feedback message indicating a first code block that is in a decoding error (e.g., code block K). The encoding device 605 may retransmit all code blocks starting from code block K. For example, if the codeword includes N code blocks, and the decoding device 610 experiences a decoding failure on code block K, the decoding device 610 may transmit the feedback message indicating the index of code block K. and the encoding device 605 may retransmit the codeword including code blocks K through N. In some examples, the retransmission may also implement spatially coupled MIMO signaling techniques.

Figure 7:
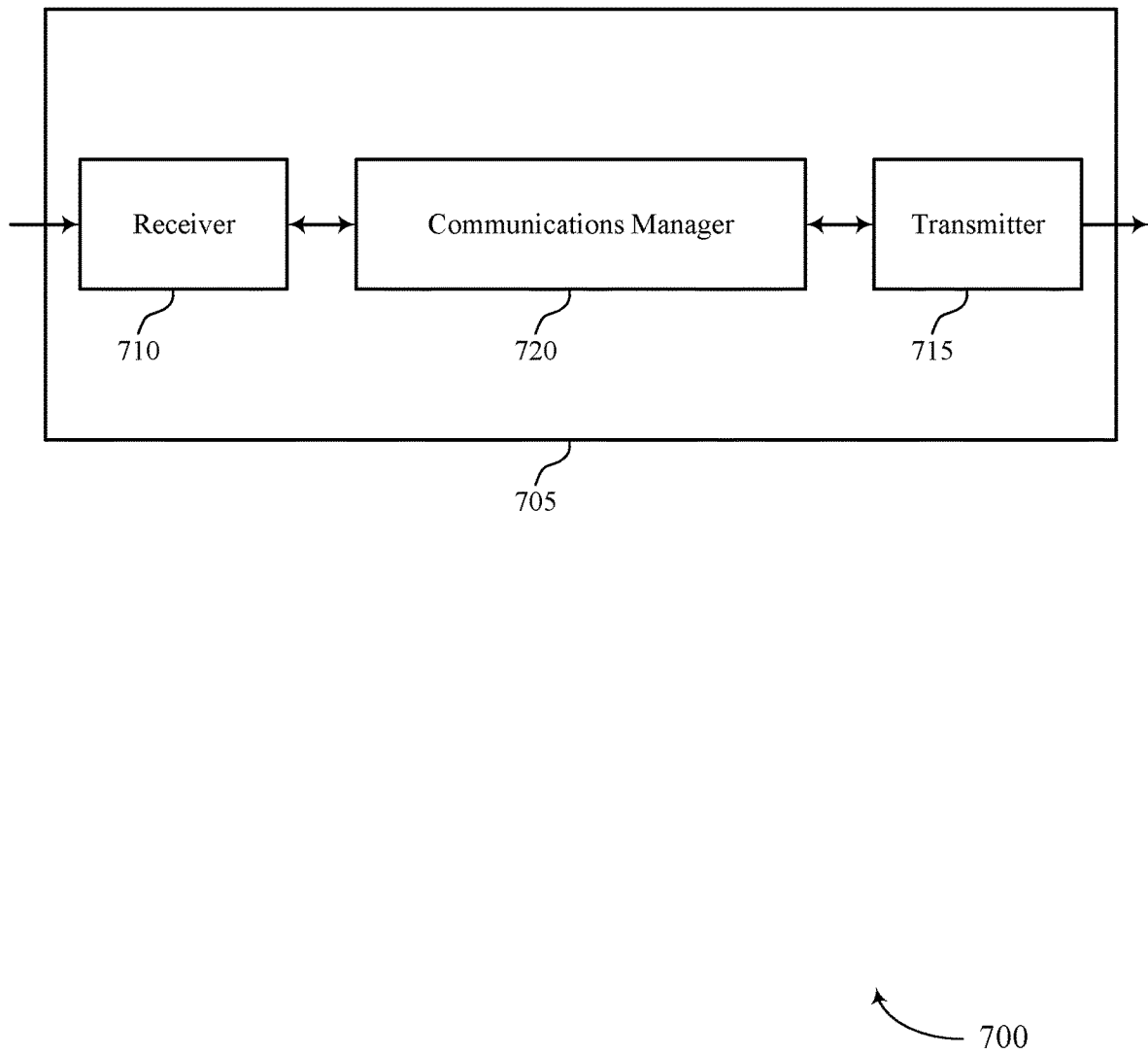
FIGS. 7 and 8 illustrate block diagrams of devices that support techniques for spatially coupled multiple-input multiple-output signaling in accordance with one or more aspects of the present disclosure.

FIG. 7 illustrates a block diagram 700 of a device 705 that supports techniques for spatially coupled multiple-input multiple-output signaling in accordance with one or more aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for spatially coupled multiple-input multiple-output signaling). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for spatially coupled multiple-input multiple-output signaling). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of techniques for spatially coupled multiple-input multiple-output signaling as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a receiving device in accordance with examples as disclosed herein. For example, the communications manager 720 may be configured as or otherwise support a means for receiving, via a set of multiple time-frequency resources using a set of multiple spatial layers, a set of multiple code blocks associated with a codeword, where the set of multiple code blocks includes a first subset of code blocks that are each received using fewer than all of the set of multiple spatial layers and a second subset of code blocks that are each received using all spatial layers of the set of multiple spatial layers, each code block of the second subset of code blocks and some of the first subset of code blocks being received in multiple code block portions, each of the multiple code block portions associated with a respective code block being received in different time-frequency resources of the set of multiple time-frequency resources and across different spatial layers of the set of multiple spatial layers. The communications manager 720 may be configured as or otherwise support a means for decoding a first code block of the first subset of code blocks based on the first code block being received using fewer than all of the set of multiple spatial layers. The communications manager 720 may be configured as or otherwise support a means for decoding, successively, additional code blocks of the first subset of code blocks or of the second subset of code blocks, or both, based on cancellation of at least one of the first code block or other previously decoded code blocks of the set of multiple code blocks from a respective signal associated with a corresponding one of the additional code blocks and received during a corresponding time-frequency resource of the set of multiple time-frequency resources.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for reduced processing complexity and reduced signaling overhead for communicating MIMO transmissions, while maintaining a channel capacity associated with MIMO transmissions.

Figure 8:
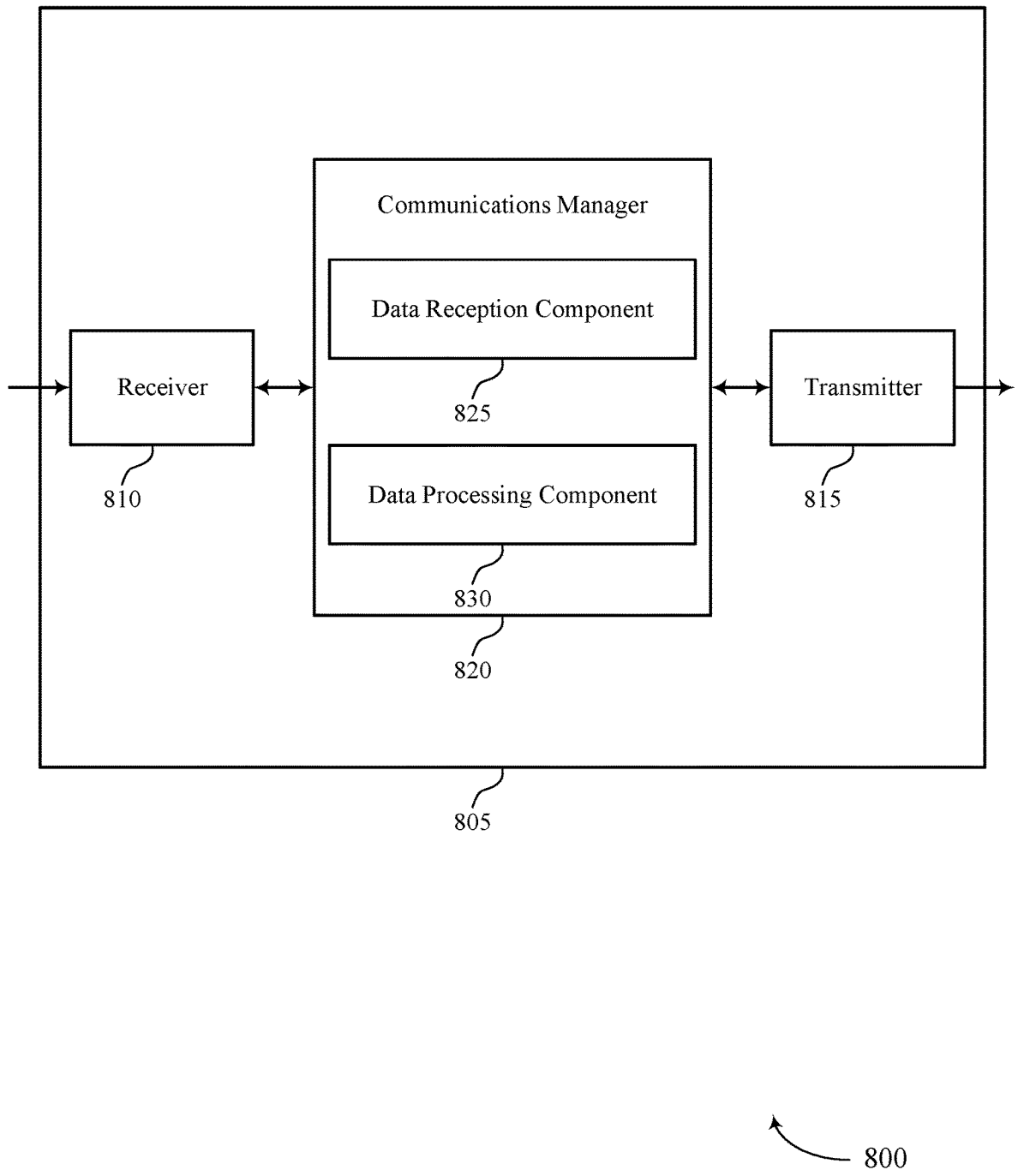

FIG. 8 illustrates a block diagram 800 of a device 805 that supports techniques for spatially coupled multiple-input multiple-output signaling in accordance with one or more aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for spatially coupled multiple-input multiple-output signaling). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for spatially coupled multiple-input multiple-output signaling). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of techniques for spatially coupled multiple-input multiple-output signaling as described herein. For example, the communications manager 820 may include a data reception component 825 a data processing component 830, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a receiving device in accordance with examples as disclosed herein. The data reception component 825 may be configured as or otherwise support a means for receiving, via a set of multiple time-frequency resources using a set of multiple spatial layers, a set of multiple code blocks associated with a codeword, where the set of multiple code blocks includes a first subset of code blocks that are each received using fewer than all of the set of multiple spatial layers and a second subset of code blocks that are each received using all spatial layers of the set of multiple spatial layers, each code block of the second subset of code blocks and some of the first subset of code blocks being received in multiple code block portions, each of the multiple code block portions associated with a respective code block being received in different time-frequency resources of the set of multiple time-frequency resources and across different spatial layers of the set of multiple spatial layers. The data processing component 830 may be configured as or otherwise support a means for decoding a first code block of the first subset of code blocks based on the first code block being received using fewer than all of the set of multiple spatial layers. The data processing component 830 may be configured as or otherwise support a means for decoding, successively, additional code blocks of the first subset of code blocks or of the second subset of code blocks, or both, based on cancellation of at least one of the first code block or other previously decoded code blocks of the set of multiple code blocks from a respective signal associated with a corresponding one of the additional code blocks and received during a corresponding time-frequency resource of the set of multiple time-frequency resources.

Figure 9:
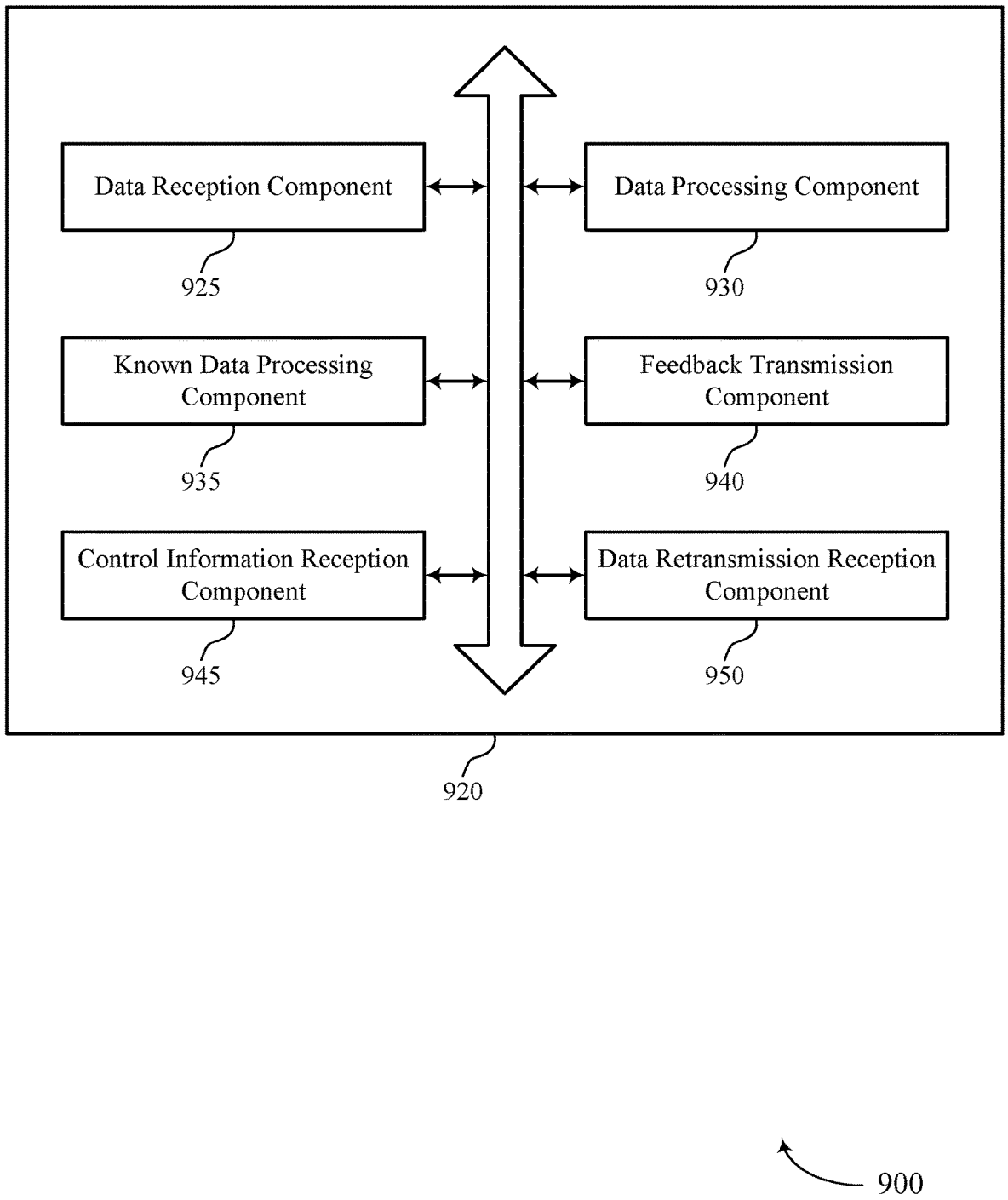
FIG. 9 illustrates a block diagram of a communications manager that supports techniques for spatially coupled multiple-input multiple-output signaling in accordance with one or more aspects of the present disclosure.

FIG. 9 illustrates a block diagram 900 of a communications manager 920 that supports techniques for spatially coupled multiple-input multiple-output signaling in accordance with one or more aspects of the present disclosure. The communications manager 920 may be an example of aspects of a communications manager 720, a communications manager 820, or both, as described herein. The communications manager 920, or various components thereof, may be an example of means for performing various aspects of techniques for spatially coupled multiple-input multiple-output signaling as described herein. For example, the communications manager 920 may include a data reception component 925, a data processing component 930, a known data processing component 935, a feedback transmission component 940, a control information reception component 945, a data retransmission reception component 950, or any combination thereof. Each of these components may communicate, directly or indirectly, with one another (e.g., via one or more buses).

The communications manager 920 may support wireless communications at a receiving device in accordance with examples as disclosed herein. The data reception component 925 may be configured as or otherwise support a means for receiving, via a set of multiple time-frequency resources using a set of multiple spatial layers, a set of multiple code blocks associated with a codeword, where the set of multiple code blocks includes a first subset of code blocks that are each received using fewer than all of the set of multiple spatial layers and a second subset of code blocks that are each received using all spatial layers of the set of multiple spatial layers, each code block of the second subset of code blocks and some of the first subset of code blocks being received in multiple code block portions, each of the multiple code block portions associated with a respective code block being received in different time-frequency resources of the set of multiple time-frequency resources and across different spatial layers of the set of multiple spatial layers. The data processing component 930 may be configured as or otherwise support a means for decoding a first code block of the first subset of code blocks based on the first code block being received using fewer than all of the set of multiple spatial layers. In some examples, the data processing component 930 may be configured as or otherwise support a means for decoding, successively, additional code blocks of the first subset of code blocks or of the second subset of code blocks, or both, based on cancellation of at least one of the first code block or other previously decoded code blocks of the set of multiple code blocks from a respective signal associated with a corresponding one of the additional code blocks and received during a corresponding time-frequency resource of the set of multiple time-frequency resources.

In some examples, to support decoding, successively, the additional code blocks, the data processing component 930 may be configured as or otherwise support a means for decoding a first portion of an additional code block of the first subset of code blocks to obtain information bits based on a cancellation of a second portion of the additional code block of the first subset of code blocks.

In some examples, to support decoding the first code block of the first subset of code blocks, the known data processing component 935 may be configured as or otherwise support a means for decoding information with a high priority from the first code block based on the first code block having a known sequence.

In some examples, the information with the high priority corresponds to a MAC message, a high priority logical channel, a MAC header, a RLC header, a PDCP header, a TCP header, or any combination thereof.

In some examples, the feedback transmission component 940 may be configured as or otherwise support a means for transmitting, in response to the set of multiple code blocks associated with the codeword, a feedback message indicating a first acknowledgment feedback for the first subset of code blocks and a second acknowledgment feedback for the second subset of code blocks.

In some examples, the known data processing component 935 may be configured as or otherwise support a means for decoding, during a middle one or more code blocks of the codeword in the first subset of code blocks, the middle one or more code blocks based on the middle one or more code blocks having a known sequence.

In some examples, the data processing component 930 may be configured as or otherwise support a means for decoding, during a middle duration in time of the set of multiple time-frequency resources, a third subset of blocks with a lower MCS than a MCS applied for the first subset of code blocks and the second subset of code blocks.

In some examples, to support decoding the first code block, the known data processing component 935 may be configured as or otherwise support a means for decoding the first code block of the first subset of code blocks based on the first code block including a zero-power signal.

In some examples, the first subset of code blocks includes a first quantity of information bits, and the second subset of code blocks includes a second quantity of information bits that is greater than the first quantity of information bits.

In some examples, the decoding is based on a first processing time associated with decoding the first subset of code blocks and the second subset of code blocks, where a second processing time associated with decoding a third subset of code blocks is shorter than the first processing time, and where each code block of the third subset of code blocks occupy a same quantity of spatial layers of the set of multiple spatial layers.

In some examples, a size of a transport block corresponding to the codeword is based on a quantity of time-frequency resources of the set of multiple time-frequency resources, a MCS for the codeword, and a quantity of code blocks in the second subset of code blocks.

In some examples, the control information reception component 945 may be configured as or otherwise support a means for receiving or communicating control signaling indicating a mapping of the set of multiple code blocks to the set of multiple spatial layers across the set of multiple time-frequency resources, where the decoding is based on the mapping.

In some examples, the first code block is received via a first spatial layer with a highest channel quality of the set of multiple spatial layers, where decoding, successively, the additional code blocks is based on an ordering of the set of multiple spatial layers based on corresponding channel qualities.

In some examples, a set of multiple portions of the first code block is received via a first time-frequency resource of the set of multiple time-frequency resources using multiple spatial layers of the set of multiple spatial layers.

In some examples, the feedback transmission component 940 may be configured as or otherwise support a means for transmitting a feedback message indicating an index of a code block of the set of multiple code blocks corresponding to a decoding failure. In some examples, the data retransmission reception component 950 may be configured as or otherwise support a means for receiving, via a second set of multiple time-frequency resources using the set of multiple spatial layers, a retransmission of a portion of the set of multiple code blocks from the code block corresponding to the decoding failure to a last code block of the set of multiple code blocks.

Figure 10:
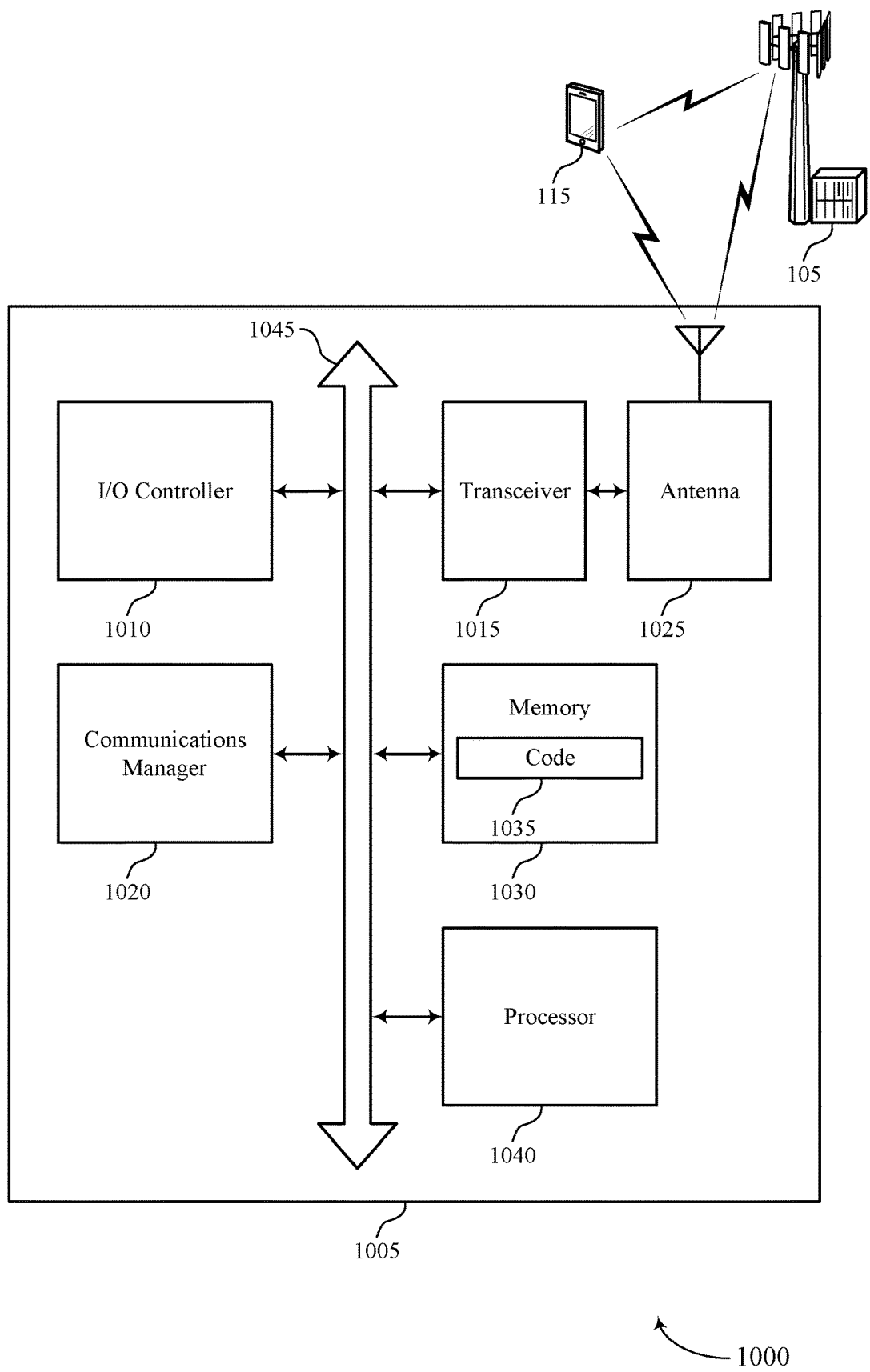
FIG. 10 illustrates a diagram of a system including a device that supports techniques for spatially coupled multiple-input multiple-output signaling in accordance with one or more aspects of the present disclosure.

FIG. 10 illustrates a diagram of a system 1000 including a device 1005 that supports techniques for spatially coupled multiple-input multiple-output signaling in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques for spatially coupled multiple-input multiple-output signaling). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communications at a receiving device in accordance with examples as disclosed herein. For example, the communications manager 1020 may be configured as or otherwise support a means for receiving, via a set of multiple time-frequency resources using a set of multiple spatial layers, a set of multiple code blocks associated with a codeword, where the set of multiple code blocks includes a first subset of code blocks that are each received using fewer than all of the set of multiple spatial layers and a second subset of code blocks that are each received using all spatial layers of the set of multiple spatial layers, each code block of the second subset of code blocks and some of the first subset of code blocks being received in multiple code block portions, each of the multiple code block portions associated with a respective code block being received in different time-frequency resources of the set of multiple time-frequency resources and across different spatial layers of the set of multiple spatial layers. The communications manager 1020 may be configured as or otherwise support a means for decoding a first code block of the first subset of code blocks based on the first code block being received using fewer than all of the set of multiple spatial layers. The communications manager 1020 may be configured as or otherwise support a means for decoding, successively, additional code blocks of the first subset of code blocks or of the second subset of code blocks, or both, based on cancellation of at least one of the first code block or other previously decoded code blocks of the set of multiple code blocks from a respective signal associated with a corresponding one of the additional code blocks and received during a corresponding time-frequency resource of the set of multiple time-frequency resources.

By including or configuring the communications manager 1020 in accordance with examples as described herein, the device 1005 may support techniques for communicating MIMO transmissions, while maintaining a channel capacity associated with MIMO transmissions.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of techniques for spatially coupled multiple-input multiple-output signaling as described herein, or the processor 1040 and the memory 1030 may be otherwise configured to perform or support such operations.

Figure 11:
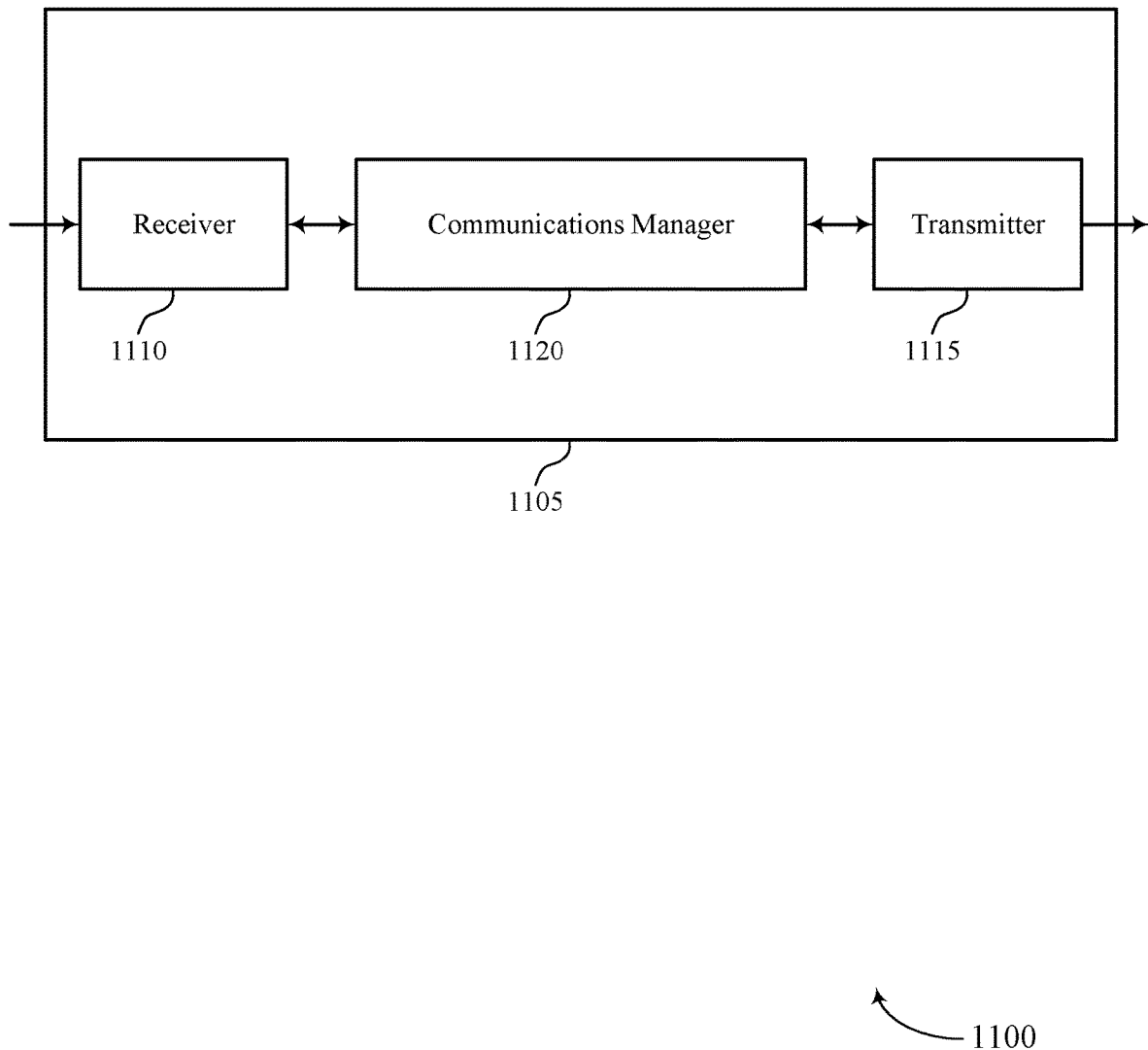
FIGS. 11 and 12 illustrate block diagrams of devices that support techniques for spatially coupled multiple-input multiple-output signaling in accordance with one or more aspects of the present disclosure.

FIG. 11 illustrates a block diagram 1100 of a device 1105 that supports techniques for spatially coupled multiple-input multiple-output signaling in accordance with one or more aspects of the present disclosure. The device 1105 may be an example of aspects of a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The communications manager 1120, the receiver 1110, the transmitter 1115, or various combinations thereof or various components thereof may be examples of means for performing various aspects of techniques for spatially coupled multiple-input multiple-output signaling as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a transmitting device in accordance with examples as disclosed herein. For example, the communications manager 1120 may be configured as or otherwise support a means for encoding, for transmission via a set of multiple time-frequency resources and via a set of multiple spatial layers, a set of multiple code blocks associated with a codeword, where the set of multiple code blocks are encoded into a first subset of code blocks that are each to be transmitted using fewer than all of the set of multiple spatial layers and into a second subset of code blocks that are each to be transmitted using all spatial layers of the set of multiple spatial layers, each code block of the second subset of code blocks and some of the first subset of code blocks being encoded for transmission in multiple code block portions, each of the multiple code block portions associated with a respective code block being encoded for transmission in different time-frequency resources of the set of multiple time-frequency resources and across different spatial layers of the set of multiple spatial layers. The communications manager 1120 may be configured as or otherwise support a means for transmitting respective signals during corresponding time-frequency resources of the set of multiple time-frequency resources, each of the respective signals including one or more code blocks from the first subset of code blocks, one or more code blocks from the second subset of code blocks, or combinations thereof.

By including or configuring the communications manager 1120 in accordance with examples as described herein, the device 1105 (e.g., a processor controlling or otherwise coupled with the receiver 1110, the transmitter 1115, the communications manager 1120, or a combination thereof) may support techniques for reduced processing complexity and reduced signaling overhead for communicating MIMO transmissions, while maintaining a channel capacity associated with MIMO transmissions.

Figure 12:
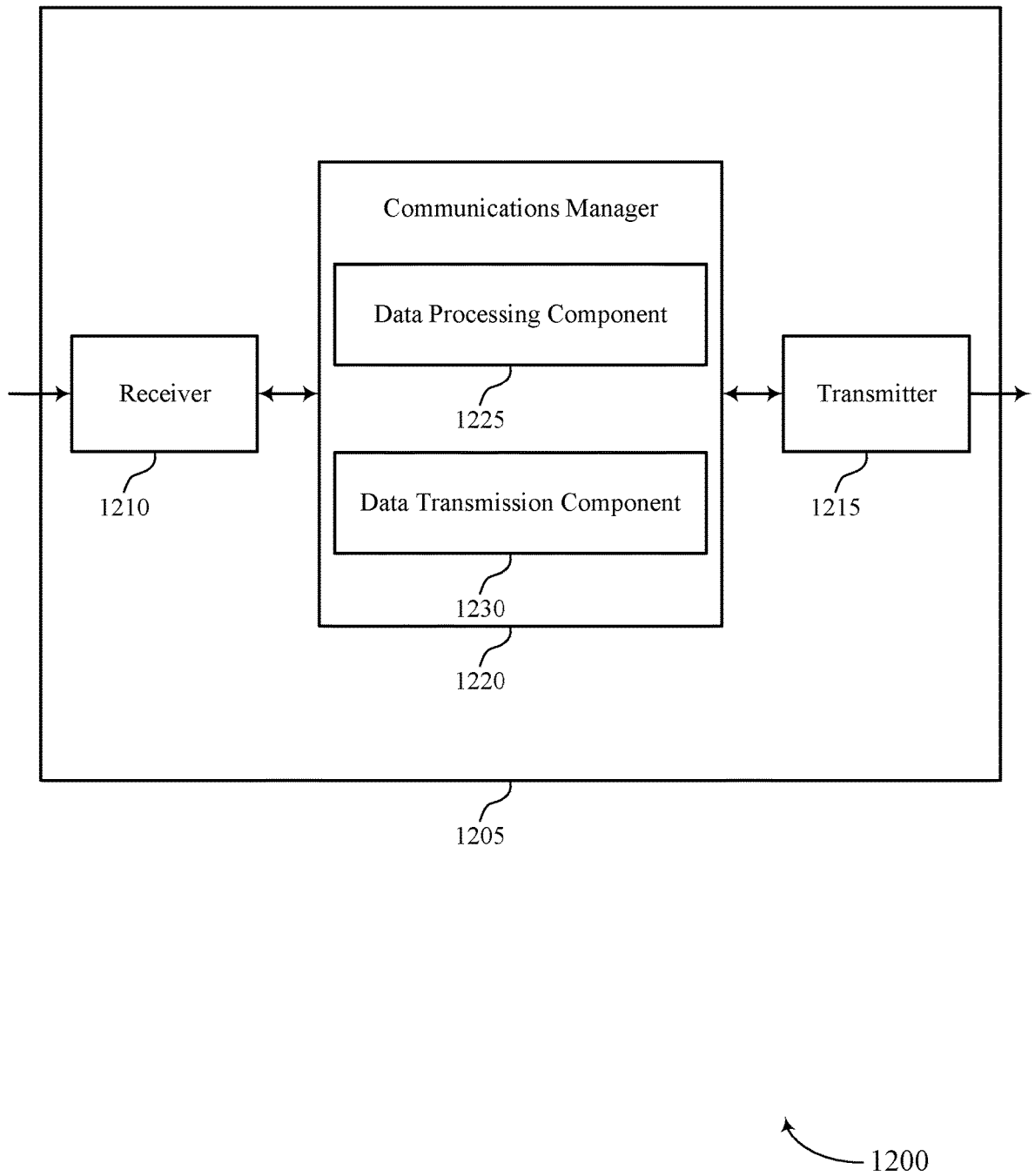

FIG. 12 illustrates a block diagram 1200 of a device 1205 that supports techniques for spatially coupled multiple-input multiple-output signaling in accordance with one or more aspects of the present disclosure. The device 1205 may be an example of aspects of a device 1105 or a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of techniques for spatially coupled multiple-input multiple-output signaling as described herein. For example, the communications manager 1220 may include a data processing component 1225 a data transmission component 1230, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications at a transmitting device in accordance with examples as disclosed herein. The data processing component 1225 may be configured as or otherwise support a means for encoding, for transmission via a set of multiple time-frequency resources and via a set of multiple spatial layers, a set of multiple code blocks associated with a codeword, where the set of multiple code blocks are encoded into a first subset of code blocks that are each to be transmitted using fewer than all of the set of multiple spatial layers and into a second subset of code blocks that are each to be transmitted using all spatial layers of the set of multiple spatial layers, each code block of the second subset of code blocks and some of the first subset of code blocks being encoded for transmission in multiple code block portions, each of the multiple code block portions associated with a respective code block being encoded for transmission in different time-frequency resources of the set of multiple time-frequency resources and across different spatial layers of the set of multiple spatial layers. The data transmission component 1230 may be configured as or otherwise support a means for transmitting respective signals during corresponding time-frequency resources of the set of multiple time-frequency resources, each of the respective signals including one or more code blocks from the first subset of code blocks, one or more code blocks from the second subset of code blocks, or combinations thereof.

Figure 13:
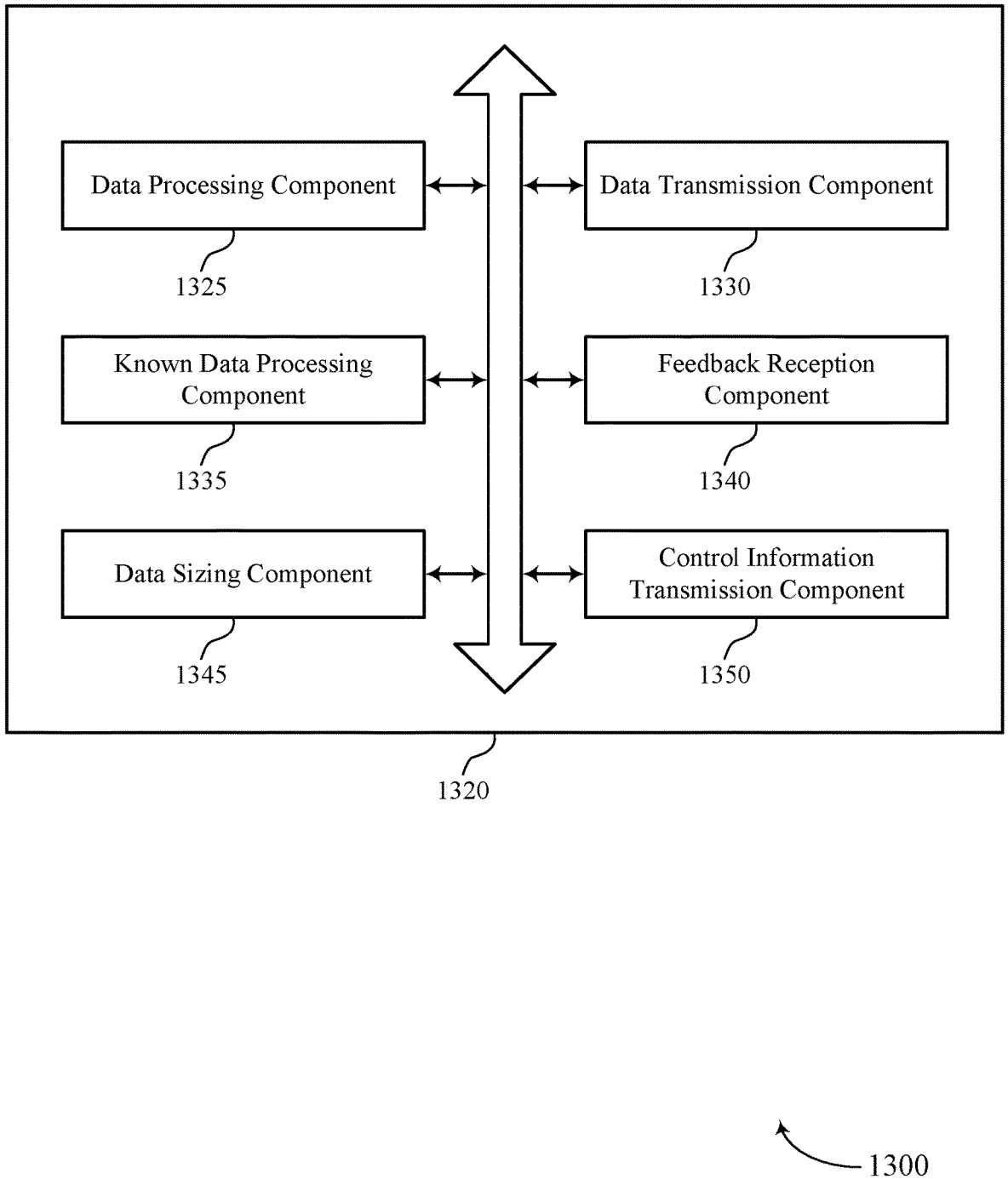
FIG. 13 illustrates a block diagram of a communications manager that supports techniques for spatially coupled multiple-input multiple-output signaling in accordance with one or more aspects of the present disclosure.

FIG. 13 illustrates a block diagram 1300 of a communications manager 1320 that supports techniques for spatially coupled multiple-input multiple-output signaling in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of techniques for spatially coupled multiple-input multiple-output signaling as described herein. For example, the communications manager 1320 may include a data processing component 1325, a data transmission component 1330, a known data processing component 1335, a feedback reception component 1340, a data sizing component 1345, a control information transmission component 1350, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1320 may support wireless communications at a transmitting device in accordance with examples as disclosed herein. The data processing component 1325 may be configured as or otherwise support a means for encoding, for transmission via a set of multiple time-frequency resources and via a set of multiple spatial layers, a set of multiple code blocks associated with a codeword, where the set of multiple code blocks are encoded into a first subset of code blocks that are each to be transmitted using fewer than all of the set of multiple spatial layers and into a second subset of code blocks that are each to be transmitted using all spatial layers of the set of multiple spatial layers, each code block of the second subset of code blocks and some of the first subset of code blocks being encoded for transmission in multiple code block portions, each of the multiple code block portions associated with a respective code block being encoded for transmission in different time-frequency resources of the set of multiple time-frequency resources and across different spatial layers of the set of multiple spatial layers. The data transmission component 1330 may be configured as or otherwise support a means for transmitting respective signals during corresponding time-frequency resources of the set of multiple time-frequency resources, each of the respective signals including one or more code blocks from the first subset of code blocks, one or more code blocks from the second subset of code blocks, or combinations thereof.

In some examples, the first subset of code blocks include a first quantity of information bits, and the second subset of code blocks include a second quantity of information bits that is greater than the first quantity of information bits.

In some examples, to support encoding the set of multiple code blocks, the known data processing component 1335 may be configured as or otherwise support a means for encoding information with a high priority into the first subset of code blocks based on the first subset of code blocks having a sequence known by a receiver.

In some examples, the information with the high priority corresponds to a MAC message, a high priority logical channel, a MAC header, a RLC header, a PDCP header, a TCP header, or any combination thereof.

In some examples, the feedback reception component 1340 may be configured as or otherwise support a means for receiving, in response to the respective signals, a feedback message indicating a first acknowledgment feedback for the first subset of code blocks and a second acknowledgment feedback for the second subset of code blocks.

In some examples, the data processing component 1325 may be configured as or otherwise support a means for encoding, in a middle portion of the codeword, at least one code block of the first subset of code blocks.

In some examples, the data processing component 1325 may be configured as or otherwise support a means for encoding, in a middle portion of the codeword, a third subset of code blocks with a lower MCS than a MCS applied for the first subset of code blocks and the second subset of code blocks.

In some examples, to support encoding the set of multiple code blocks, the known data processing component 1335 may be configured as or otherwise support a means for encoding the first subset of code blocks based on the first subset of code blocks including a zero-power signal.

In some examples, the data sizing component 1345 may be configured as or otherwise support a means for determining a size of a transport block corresponding to the codeword is based on a quantity of time-frequency resources of the set of multiple time-frequency resources, a MCS for the codeword, and a quantity of code blocks in the second subset of code blocks.

In some examples, the control information transmission component 1350 may be configured as or otherwise support a means for communicating control signaling indicating a mapping of the set of multiple code blocks to the set of multiple spatial layers across the set of multiple time-frequency resources, where the encoding is based on the mapping.

In some examples, the data transmission component 1330 may be configured as or otherwise support a means for transmitting a first code block of the first subset of code blocks via a first spatial layer with a highest channel quality of the set of multiple spatial layers, where additional code blocks are transmitted based on an ordering of the set of multiple spatial layers based on corresponding channel qualities.

In some examples, the data transmission component 1330 may be configured as or otherwise support a means for transmitting, via a first time-frequency resource of the set of multiple time-frequency resources, a first set of multiple portions of a first code block using a first subset of the set of multiple spatial layers and a second set of multiple portions of a second code block using a second subset of the set of multiple spatial layers.

Figure 14:
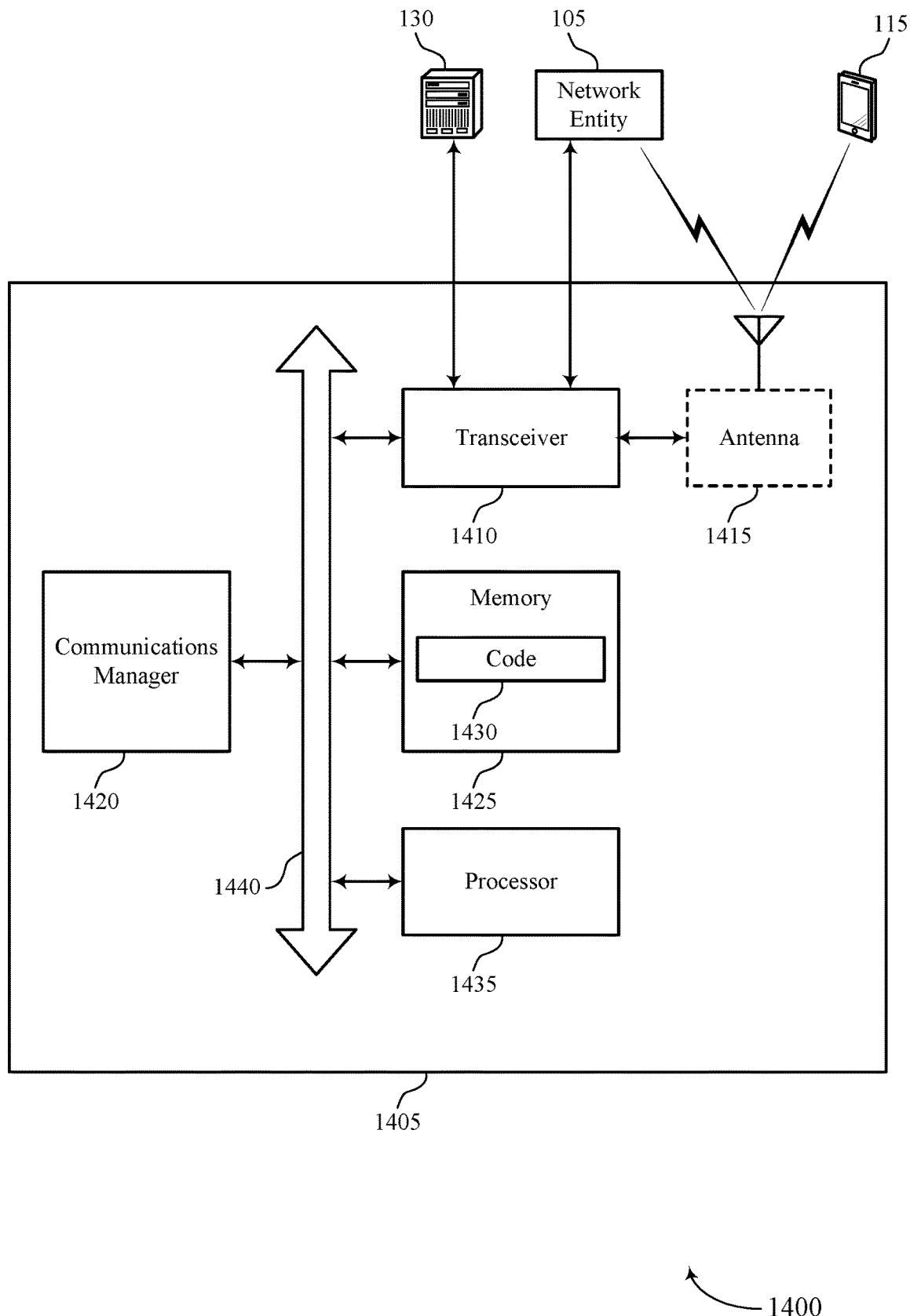
FIG. 14 illustrates a diagram of a system including a device that supports techniques for spatially coupled multiple-input multiple-output signaling in accordance with one or more aspects of the present disclosure.

FIG. 14 illustrates a diagram of a system 1400 including a device 1405 that supports techniques for spatially coupled multiple-input multiple-output signaling in accordance with one or more aspects of the present disclosure. The device 1405 may be an example of or include the components of a device 1105, a device 1205, or a network entity 105 as described herein. The device 1405 may communicate with one or more network entities 105, one or more UEs 115, or any combination thereof, which may include communications over one or more wired interfaces, over one or more wireless interfaces, or any combination thereof. The device 1405 may include components that support outputting and obtaining communications, such as a communications manager 1420, a transceiver 1410, an antenna 1415, a memory 1425, code 1430, and a processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. In some implementations, the transceiver 1410 may include one or more interfaces, such as one or more interfaces coupled with the one or more antennas 1415 that are configured to support various receiving or obtaining operations, or one or more interfaces coupled with the one or more antennas 1415 that are configured to support various transmitting or outputting operations, or a combination thereof. In some implementations, the transceiver 1410 may include or be configured for coupling with one or more processors or memory components that are operable to perform or support operations based on received or obtained information or signals, or to generate information or other signals for transmission or other outputting, or any combination thereof. In some implementations, the transceiver 1410, or the transceiver 1410 and the one or more antennas 1415, or the transceiver 1410 and the one or more antennas 1415 and one or more processors or memory components (for example, the processor 1435, or the memory 1425, or both), may be included in a chip or chip assembly that is installed in the device 1405. In some examples, the transceiver may be operable to support communications via one or more communications links (e.g., a communication link 125, a backhaul communication link 120, a midhaul communication link 162, a fronthaul communication link 168).

The memory 1425 may include RAM and ROM. The memory 1425 may store computer-readable, computer-executable code 1430 including instructions that, when executed by the processor 1435, cause the device 1405 to perform various functions described herein. The code 1430 may be stored in a non-transitory computer-readable medium such as system memory or another type of memory. In some cases, the code 1430 may not be directly executable by the processor 1435 but may cause a computer (e.g., when compiled and executed) to perform functions described herein. In some cases, the memory 1425 may contain, among other things, a BIOS which may control basic hardware or software operation such as the interaction with peripheral components or devices.

The processor 1435 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1435 may be configured to operate a memory array using a memory controller. In some other cases, a memory controller may be integrated into the processor 1435. The processor 1435 may be configured to execute computer-readable instructions stored in a memory (e.g., the memory 1425) to cause the device 1405 to perform various functions (e.g., functions or tasks supporting techniques for spatially coupled multiple-input multiple-output signaling). For example, the device 1405 or a component of the device 1405 may include a processor 1435 and memory 1425 coupled with the processor 1435, the processor 1435 and memory 1425 configured to perform various functions described herein. The processor 1435 may be an example of a cloud-computing platform (e.g., one or more physical nodes and supporting software such as operating systems, virtual machines, or container instances) that may host the functions (e.g., by executing code 1430) to perform the functions of the device 1405. The processor 1435 may be any one or more suitable processors capable of executing scripts or instructions of one or more software programs stored in the device 1405 (such as within the memory 1425). In some implementations, the processor 1435 may be a component of a processing system. A processing system may generally refer to a system or series of machines or components that receives inputs and processes the inputs to produce a set of outputs (which may be passed to other systems or components of, for example, the device 1405). For example, a processing system of the device 1405 may refer to a system including the various other components or subcomponents of the device 1405, such as the processor 1435, or the transceiver 1410, or the communications manager 1420, or other components or combinations of components of the device 1405. The processing system of the device 1405 may interface with other components of the device 1405, and may process information received from other components (such as inputs or signals) or output information to other components. For example, a chip or modem of the device 1405 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1405 may transmit information output from the chip or modem. Additionally, or alternatively, in some implementations, the one or more interfaces may refer to an interface between the processing system of the chip or modem and a receiver, such that the device 1405 may obtain information or signal inputs, and the information may be passed to the processing system. A person having ordinary skill in the art will readily recognize that a first interface also may obtain information or signal inputs, and a second interface also may output information or signal outputs.

In some examples, a bus 1440 may support communications of (e.g., within) a protocol layer of a protocol stack. In some examples, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the memory 1425, the code 1430, and the processor 1435 may be located in one of the different components or divided between different components).

In some examples, the communications manager 1420 may manage aspects of communications with a core network 130 (e.g., via one or more wired or wireless backhaul links). For example, the communications manager 1420 may manage the transfer of data communications for client devices, such as one or more UEs 115. In some examples, the communications manager 1420 may manage communications with other network entities 105, and may include a controller or scheduler for controlling communications with UEs 115 in cooperation with other network entities 105. In some examples, the communications manager 1420 may support an X2 interface within an LTE/LTE-A wireless communications network technology to provide communication between network entities 105.

The communications manager 1420 may support wireless communications at a transmitting device in accordance with examples as disclosed herein. For example, the communications manager 1420 may be configured as or otherwise support a means for encoding, for transmission via a set of multiple time-frequency resources and via a set of multiple spatial layers, a set of multiple code blocks associated with a codeword, where the set of multiple code blocks are encoded into a first subset of code blocks that are each to be transmitted using fewer than all of the set of multiple spatial layers and into a second subset of code blocks that are each to be transmitted using all spatial layers of the set of multiple spatial layers, each code block of the second subset of code blocks and some of the first subset of code blocks being encoded for transmission in multiple code block portions, each of the multiple code block portions associated with a respective code block being encoded for transmission in different time-frequency resources of the set of multiple time-frequency resources and across different spatial layers of the set of multiple spatial layers. The communications manager 1420 may be configured as or otherwise support a means for transmitting respective signals during corresponding time-frequency resources of the set of multiple time-frequency resources, each of the respective signals including one or more code blocks from the first subset of code blocks, one or more code blocks from the second subset of code blocks, or combinations thereof.

By including or configuring the communications manager 1420 in accordance with examples as described herein, the device 1405 may support techniques for communicating MIMO transmissions, while maintaining a channel capacity associated with MIMO transmissions.

In some examples, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some examples, one or more functions described with reference to the communications manager 1420 may be supported by or performed by the transceiver 1410, the processor 1435, the memory 1425, the code 1430, or any combination thereof. For example, the code 1430 may include instructions executable by the processor 1435 to cause the device 1405 to perform various aspects of techniques for spatially coupled multiple-input multiple-output signaling as described herein, or the processor 1435 and the memory 1425 may be otherwise configured to perform or support such operations.

Figure 15:
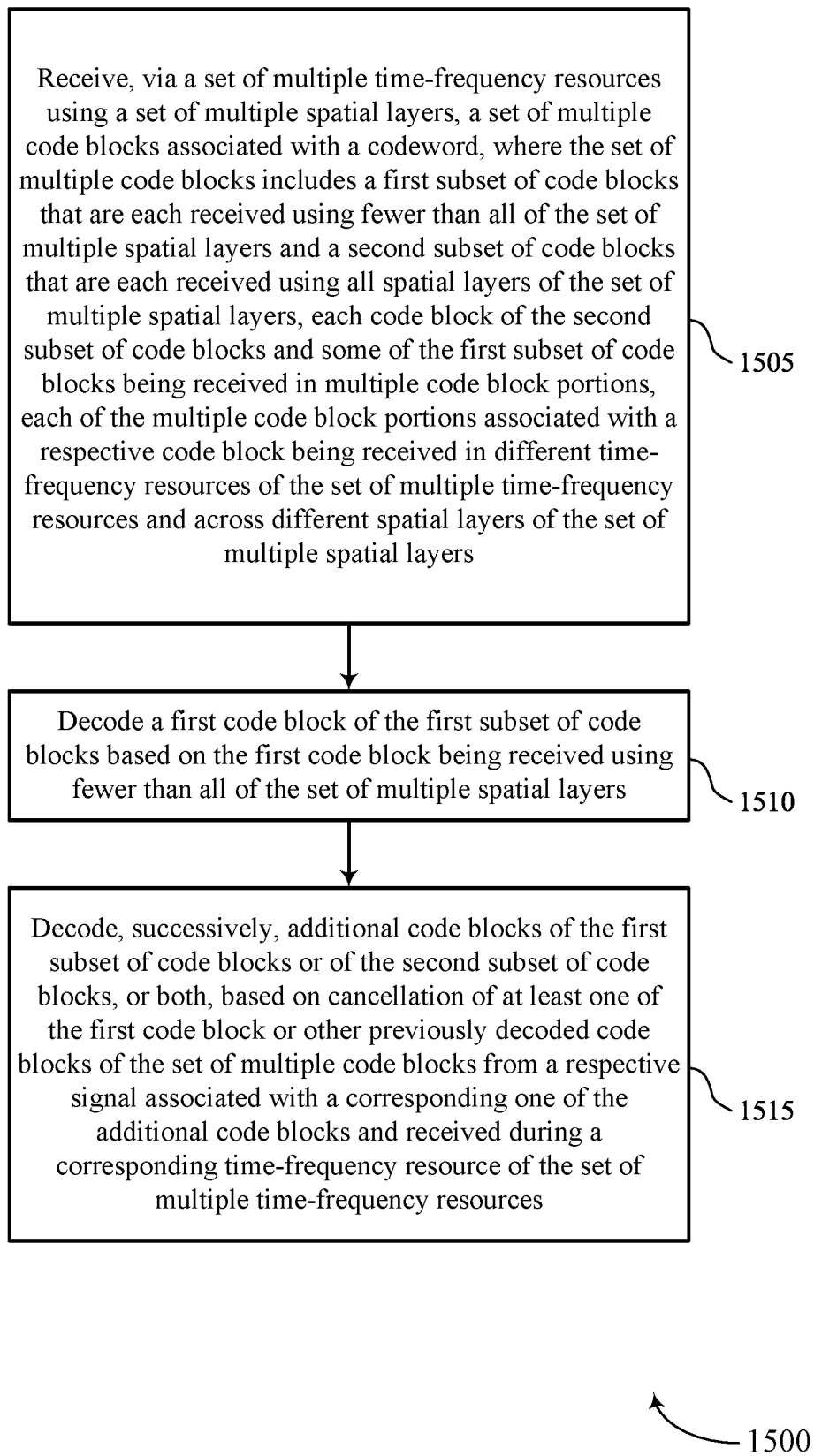
FIGS. 15 and 16 illustrate flowcharts showing methods that support techniques for spatially coupled multiple-input multiple-output signaling in accordance with one or more aspects of the present disclosure.

FIG. 15 illustrates a flowchart showing a method 1500 that supports techniques for spatially coupled multiple-input multiple-output signaling in accordance with one or more aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, the method may include receiving, via a set of multiple time-frequency resources using a set of multiple spatial layers, a set of multiple code blocks associated with a codeword, where the set of multiple code blocks includes a first subset of code blocks that are each received using fewer than all of the set of multiple spatial layers and a second subset of code blocks that are each received using all spatial layers of the set of multiple spatial layers, each code block of the second subset of code blocks and some of the first subset of code blocks being received in multiple code block portions, each of the multiple code block portions associated with a respective code block being received in different time-frequency resources of the set of multiple time-frequency resources and across different spatial layers of the set of multiple spatial layers. The operations of 1505 may be performed in accordance with examples as disclosed herein. In some examples, aspects of the operations of 1505 may be performed by a data reception component 925 as described with reference to FIG. 9.

At 1510, the method may include decoding a first code block of the first subset of code blocks based on the first code block being received using fewer than all of the set of multiple spatial layers. The operations of 1510 may be performed in accordance with examples as disclosed herein. In some examples, aspects of the operations of 1510 may be performed by a data processing component 930 as described with reference to FIG. 9.

At 1515, the method may include decoding, successively, additional code blocks of the first subset of code blocks or of the second subset of code blocks, or both, based on cancellation of at least one of the first code block or other previously decoded code blocks of the set of multiple code blocks from a respective signal associated with a corresponding one of the additional code blocks and received during a corresponding time-frequency resource of the set of multiple time-frequency resources. The operations of 1515 may be performed in accordance with examples as disclosed herein. In some examples, aspects of the operations of 1515 may be performed by a data processing component 930 as described with reference to FIG. 9.

Figure 16:
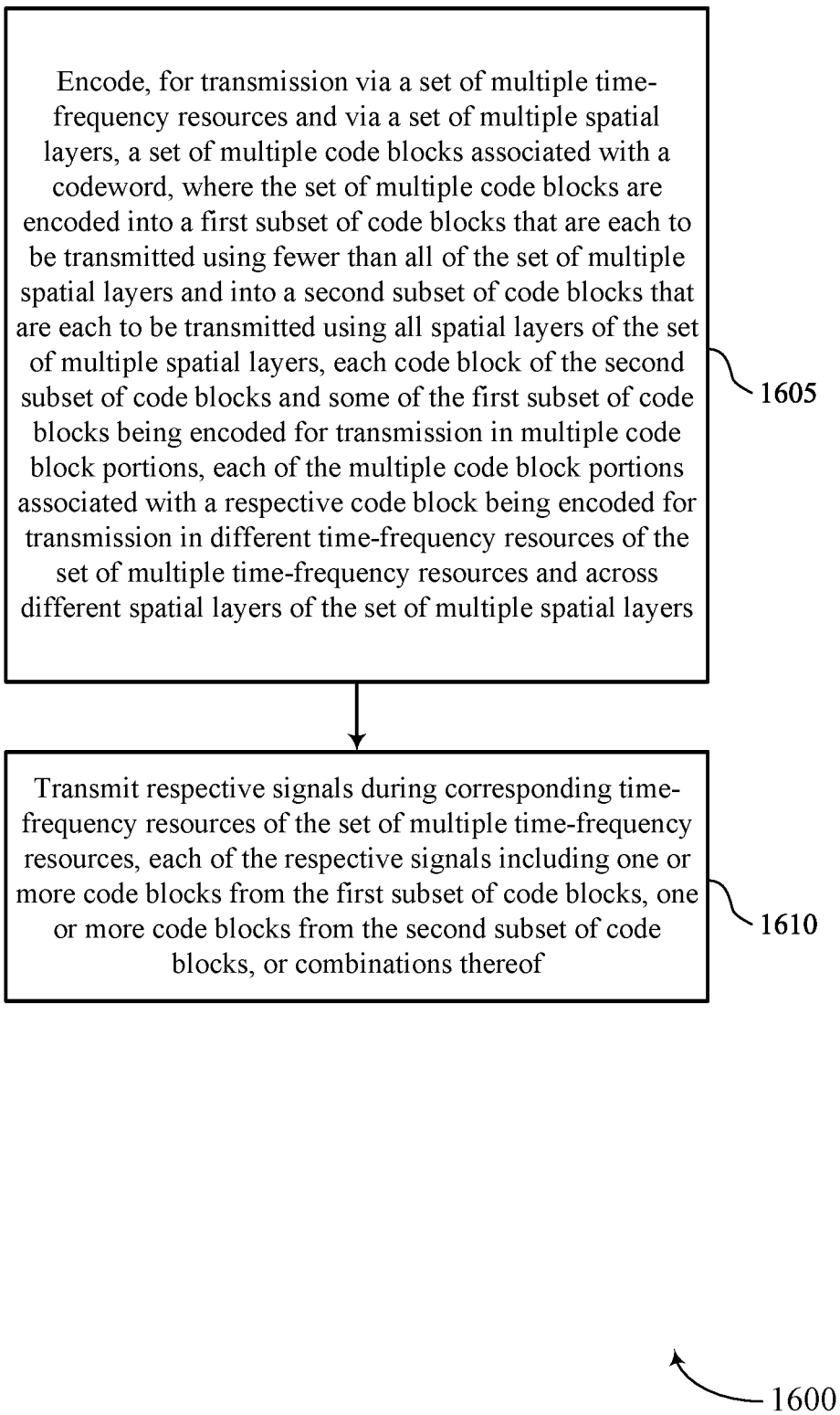

FIG. 16 illustrates a flowchart showing a method 1600 that supports techniques for spatially coupled multiple-input multiple-output signaling in accordance with one or more aspects of the present disclosure. The operations of the method 1600 may be implemented by a network entity or its components as described herein. For example, the operations of the method 1600 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1605, the method may include encoding, for transmission via a set of multiple time-frequency resources and via a set of multiple spatial layers, a set of multiple code blocks associated with a codeword, where the set of multiple code blocks are encoded into a first subset of code blocks that are each to be transmitted using fewer than all of the set of multiple spatial layers and into a second subset of code blocks that are each to be transmitted using all spatial layers of the set of multiple spatial layers, each code block of the second subset of code blocks and some of the first subset of code blocks being encoded for transmission in multiple code block portions, each of the multiple code block portions associated with a respective code block being encoded for transmission in different time-frequency resources of the set of multiple time-frequency resources and across different spatial layers of the set of multiple spatial layers. The operations of 1605 may be performed in accordance with examples as disclosed herein. In some examples, aspects of the operations of 1605 may be performed by a data processing component 1325 as described with reference to FIG. 13.

At 1610, the method may include transmitting respective signals during corresponding time-frequency resources of the set of multiple time-frequency resources, each of the respective signals including one or more code blocks from the first subset of code blocks, one or more code blocks from the second subset of code blocks, or combinations thereof. The operations of 1610 may be performed in accordance with examples as disclosed herein. In some examples, aspects of the operations of 1610 may be performed by a data transmission component 1330 as described with reference to FIG. 13.

The following provides an overview of aspects of the present disclosure:

Aspect 1: A method for wireless communications at a receiving device, comprising: receiving, via a plurality of time-frequency resources using a plurality of spatial layers, a plurality of code blocks associated with a codeword, wherein the plurality of code blocks comprises a first subset of code blocks that are each received using fewer than all of the plurality of spatial layers and a second subset of code blocks that are each received using all spatial layers of the plurality of spatial layers, each code block of all of the second subset of code blocks and some of the first subset of code blocks being received in multiple code block portions, each of the multiple code block portions associated with a respective code block being received in different time-frequency resources of the plurality of time-frequency resources and across different spatial layers of the plurality of spatial layers; decoding a first code block of the first subset of code blocks based at least in part on the first code block being received using fewer than all of the plurality of spatial layers; and decoding, successively, additional code blocks of the first subset of code blocks or of the second subset of code blocks, or both, based at least in part on cancellation of at least one of the first code block or other previously decoded code blocks of the plurality of code blocks from a respective signal associated with a corresponding one of the additional code blocks and received during a corresponding time-frequency resource of the plurality of time-frequency resources.

Aspect 2: The method of aspect 1, wherein decoding, successively, the additional code blocks comprises: decoding a first portion of an additional code block of the first subset of code blocks to obtain information bits based at least in part on a cancellation of a second portion of the additional code block of the first subset of code blocks.

Aspect 3: The method of any of aspects 1 through 2, wherein decoding the first code block of the first subset of code blocks comprises: decoding information with a high priority from the first code block based at least in part on the first code block having a known sequence.

Aspect 4: The method of aspect 3, wherein the information with the high priority corresponds to a MAC message, a high priority logical channel, a MAC header, a RLC header, a PDCP header, a TCP header, or any combination thereof.

Aspect 5: The method of any of aspects 1 through 4, further comprising: transmitting, in response to the plurality of code blocks associated with the codeword, a feedback message indicating a first acknowledgment feedback for the first subset of code blocks and a second acknowledgment feedback for the second subset of code blocks.

Aspect 6: The method of any of aspects 1 through 5, further comprising: decoding, during a middle one or more code blocks of the codeword in the first subset of code blocks, the middle one or more code blocks based at least in part on the middle one or more code blocks having a known sequence.

Aspect 7: The method of any of aspects 1 through 6, further comprising: decoding, during a middle duration in time of the plurality of time-frequency resources, a third subset of blocks with a lower MCS than a MCS applied for the first subset of code blocks and the second subset of code blocks.

Aspect 8: The method of any of aspects 1 through 7, wherein decoding the first code block comprises: decoding the first code block of the first subset of code blocks based at least in part on the first code block comprising a zero-power signal.

Aspect 9: The method of any of aspects 1 through 8, wherein the first subset of code blocks includes a first quantity of information bits, and the second subset of code blocks includes a second quantity of information bits that is greater than the first quantity of information bits.

Aspect 10: The method of any of aspects 1 through 9, wherein the decoding is based at least in part on a first processing time associated with decoding the first subset of code blocks and the second subset of code blocks, wherein a second processing time associated with decoding a third subset of code blocks is shorter than the first processing time, and wherein each code block of the third subset of code blocks occupy a same quantity of spatial layers of the plurality of spatial layers.

Aspect 11: The method of any of aspects 1 through 10, wherein a size of a transport block corresponding to the codeword is based at least in part on a quantity of time-frequency resources of the plurality of time-frequency resources, a MCS for the codeword, and a quantity of code blocks in the second subset of code blocks.

Aspect 12: The method of any of aspects 1 through 11, further comprising: communicating control signaling indicating a mapping of the plurality of code blocks to the plurality of spatial layers across the plurality of time-frequency resources, wherein the decoding is based at least in part on the mapping.

Aspect 13: The method of any of aspects 1 through 12, wherein the first code block is received via a first spatial layer with a highest channel quality of the plurality of spatial layers, wherein decoding, successively, the additional code blocks is based at least in part on an ordering of the plurality of spatial layers based at least in part on corresponding channel qualities.

Aspect 14: The method of any of aspects 1 through 13, wherein a plurality of portions of the first code block is received via a first time-frequency resource of the plurality of time-frequency resources using multiple spatial layers of the plurality of spatial layers.

Aspect 15: The method of any of aspects 1 through 14, further comprising: transmitting a feedback message indicating an index of a code block of the plurality of code blocks corresponding to a decoding failure; and receiving, via a second plurality of time-frequency resources using the plurality of spatial layers, a retransmission of a portion of the plurality of code blocks from the code block corresponding to the decoding failure to a last code block of the plurality of code blocks.

Aspect 16: A method for wireless communications at a transmitting device, comprising: encoding, for transmission via a plurality of time-frequency resources and via a plurality of spatial layers, a plurality of code blocks associated with a codeword, wherein the plurality of code blocks are encoded into a first subset of code blocks that are each to be transmitted using fewer than all of the plurality of spatial layers and into a second subset of code blocks that are each to be transmitted using all spatial layers of the plurality of spatial layers, each code block of all of the second subset of code blocks and some of the first subset of code blocks being encoded for transmission in multiple code block portions, each of the multiple code block portions associated with a respective code block being encoded for transmission in different time-frequency resources of the plurality of time-frequency resources and across different spatial layers of the plurality of spatial layers; and transmitting respective signals during corresponding time-frequency resources of the plurality of time-frequency resources, each of the respective signals including one or more code blocks from the first subset of code blocks, one or more code blocks from the second subset of code blocks, or combinations thereof.

Aspect 17: The method of aspect 16, wherein the first subset of code blocks include a first quantity of information bits, and the second subset of code blocks include a second quantity of information bits that is greater than the first quantity of information bits.

Aspect 18: The method of any of aspects 16 through 17, wherein encoding the plurality of code blocks comprises: encoding information with a high priority into the first subset of code blocks based at least in part on the first subset of code blocks having a sequence known by a receiver.

Aspect 19: The method of aspect 18, wherein the information with the high priority corresponds to a MAC message, a high priority logical channel, a MAC header, a RLC header, a PDCP header, a TCP header, or any combination thereof.

Aspect 20: The method of any of aspects 16 through 19, further comprising: receiving, in response to the respective signals, a feedback message indicating a first acknowledgment feedback for the first subset of code blocks and a second acknowledgment feedback for the second subset of code blocks.

Aspect 21: The method of any of aspects 16 through 20, further comprising: encoding, in a middle portion of the codeword, at least one code block of the first subset of code blocks.

Aspect 22: The method of any of aspects 16 through 21, further comprising: encoding, in a middle portion of the codeword, a third subset of code blocks with a lower MCS than a MCS applied for the first subset of code blocks and the second subset of code blocks.

Aspect 23: The method of any of aspects 16 through 22, wherein encoding the plurality of code blocks comprises: encoding the first subset of code blocks based at least in part on the first subset of code blocks comprising a zero-power signal.

Aspect 24: The method of any of aspects 16 through 23, further comprising: determining a size of a transport block corresponding to the codeword is based at least in part on a quantity of time-frequency resources of the plurality of time-frequency resources, a MCS for the codeword, and a quantity of code blocks in the second subset of code blocks.

Aspect 25: The method of any of aspects 16 through 24, further comprising: communicating control signaling indicating a mapping of the plurality of code blocks to the plurality of spatial layers across the plurality of time-frequency resources, wherein the encoding is based at least in part on the mapping.

Aspect 26: The method of any of aspects 16 through 25, further comprising: transmitting a first code block of the first subset of code blocks via a first spatial layer with a highest channel quality of the plurality of spatial layers, wherein additional code blocks are transmitted based at least in part on an ordering of the plurality of spatial layers based at least in part on corresponding channel qualities.

Aspect 27: The method of any of aspects 16 through 26, further comprising: transmitting, via a first time-frequency resource of the plurality of time-frequency resources, a first plurality of portions of a first code block using a first subset of the plurality of spatial layers and a second plurality of portions of a second code block using a second subset of the plurality of spatial layers.

Aspect 28: An apparatus for wireless communications at a receiving device, comprising a processor; memory coupled with the processor; and instructions stored in the memory and executable by the processor to cause the apparatus to perform a method of any of aspects 1 through 15.

Aspect 29: An apparatus for wireless communications at a receiving device, comprising at least one means for performing a method of any of aspects 1 through 15.

Aspect 30: A non-transitory computer-readable medium storing code for wireless communications at a receiving device, the code comprising instructions executable by a processor to perform a method of any of aspects 1 through 15.

Aspect 31: An apparatus for wireless communications at a transmitting device, comprising a processor; memory coupled with the processor; and instructions stored in the memory and executable by the processor to cause the apparatus to perform a method of any of aspects 16 through 27.

Aspect 32: An apparatus for wireless communications at a transmitting device, comprising at least one means for performing a method of any of aspects 16 through 27.

Aspect 33: A non-transitory computer-readable medium storing code for wireless communications at a transmitting device, the code comprising instructions executable by a processor to perform a method of any of aspects 16 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a receiving device, comprising:
   a processor;
   memory coupled with the processor; and
   instructions stored in the memory and executable by the processor to cause the apparatus to:
   receive, via a plurality of time-frequency resources using a plurality of spatial layers, a plurality of code blocks associated with a codeword, wherein the plurality of code blocks comprises a first subset of code blocks that are each received using fewer than all of the plurality of spatial layers and a second subset of code blocks that are each received using all spatial layers of the plurality of spatial layers, each code block of the second subset of code blocks and some of the first subset of code blocks being received in multiple code block portions, each of the multiple code block portions associated with a respective code block being received in different time-frequency resources of the plurality of time-frequency resources and across different spatial layers of the plurality of spatial layers;
   decode a first code block of the first subset of code blocks based at least in part on the first code block being received using fewer than all of the plurality of spatial layers; and
   decode, successively, additional code blocks of the first subset of code blocks or of the second subset of code blocks, or both, based at least in part on cancellation of at least one of the first code block or other previously decoded code blocks of the plurality of code blocks from a respective signal associated with a corresponding one of the additional code blocks and received during a corresponding time-frequency resource of the plurality of time-frequency resources.

2. The apparatus of claim 1, wherein the instructions to decode, successively, the additional code blocks are executable by the processor to cause the apparatus to:
   decode a first portion of an additional code block of the first subset of code blocks to obtain information bits based at least in part on a cancellation of a second portion of the additional code block of the first subset of code blocks.

3. The apparatus of claim 1, wherein the instructions to decode the first code block of the first subset of code blocks are executable by the processor to cause the apparatus to:
   decode information with a high priority from the first code block based at least in part on the first code block having a known sequence.

4. The apparatus of claim 3, wherein:
   the information with the high priority corresponds to a medium access control message, a high priority logical channel, a medium access control header, a radio link control header, a physical data convergence protocol header, a transmission control protocol header, or any combination thereof.

5. The apparatus of claim 1, wherein the instructions are further executable by the processor to cause the apparatus to:
   transmit, in response to the plurality of code blocks associated with the codeword, a feedback message indicating a first acknowledgment feedback for the first subset of code blocks and a second acknowledgment feedback for the second subset of code blocks.

6. The apparatus of claim 1, wherein the instructions are further executable by the processor to cause the apparatus to:
   decode, during a middle one or more code blocks of the codeword in the first subset of code blocks, the middle one or more code blocks based at least in part on the middle one or more code blocks having a known sequence.

7. The apparatus of claim 1, wherein the instructions are further executable by the processor to cause the apparatus to:
   decode, during a middle duration in time of the plurality of time-frequency resources, a third subset of blocks with a lower modulation and coding scheme than a modulation and coding scheme applied for the first subset of code blocks and the second subset of code blocks.

8. The apparatus of claim 1, wherein the instructions to decode the first code block are executable by the processor to cause the apparatus to:
   decode the first code block of the first subset of code blocks based at least in part on the first code block comprising a zero-power signal.

9. The apparatus of claim 1, wherein the first subset of code blocks includes a first quantity of information bits, and the second subset of code blocks includes a second quantity of information bits that is greater than the first quantity of information bits.

10. The apparatus of claim 1, wherein:
    the decoding is based at least in part on a first processing time associated with decoding the first subset of code blocks and the second subset of code blocks, wherein a second processing time associated with decoding a third subset of code blocks is shorter than the first processing time, and wherein each code block of the third subset of code blocks occupy a same quantity of spatial layers of the plurality of spatial layers.

11. The apparatus of claim 1, wherein a size of a transport block corresponding to the codeword is based at least in part on a quantity of time-frequency resources of the plurality of time-frequency resources, a modulation and coding scheme for the codeword, and a quantity of code blocks in the second subset of code blocks.

12. The apparatus of claim 1, wherein the instructions are further executable by the processor to cause the apparatus to:
    communicate control signaling indicating a mapping of the plurality of code blocks to the plurality of spatial layers across the plurality of time-frequency resources, wherein the decoding is based at least in part on the mapping.

13. The apparatus of claim 1, wherein:
the first code block is received via a first spatial layer with a highest channel quality of the plurality of spatial layers, wherein decoding, successively, the additional code blocks is based at least in part on an ordering of the plurality of spatial layers based at least in part on corresponding channel qualities.

14. The apparatus of claim 1, wherein a plurality of portions of the first code block is received via a first time-frequency resource of the plurality of time-frequency resources using multiple spatial layers of the plurality of spatial layers.

15. The apparatus of claim 1, wherein the instructions are further executable by the processor to cause the apparatus to:
transmit a feedback message indicating an index of a code block of the plurality of code blocks corresponding to a decoding failure; and
receive, via a second plurality of time-frequency resources using the plurality of spatial layers, a retransmission of a portion of the plurality of code blocks from the code block corresponding to the decoding failure to a last code block of the plurality of code blocks.

16. An apparatus for wireless communications at a transmitting device, comprising:
a processor;
memory coupled with the processor; and
instructions stored in the memory and executable by the processor to cause the apparatus to:
encode, for transmission via a plurality of time-frequency resources and via a plurality of spatial layers, a plurality of code blocks associated with a codeword, wherein the plurality of code blocks are encoded into a first subset of code blocks that are each to be transmitted using fewer than all of the plurality of spatial layers and into a second subset of code blocks that are each to be transmitted using all spatial layers of the plurality of spatial layers, each code block of the second subset of code blocks and some of the first subset of code blocks being encoded for transmission in multiple code block portions, each of the multiple code block portions associated with a respective code block being encoded for transmission in different time-frequency resources of the plurality of time-frequency resources and across different spatial layers of the plurality of spatial layers; and
transmit respective signals during corresponding time-frequency resources of the plurality of time-frequency resources, each of the respective signals including one or more code blocks from the first subset of code blocks, one or more code blocks from the second subset of code blocks, or combinations thereof.

17. The apparatus of claim 16, wherein the first subset of code blocks include a first quantity of information bits, and the second subset of code blocks include a second quantity of information bits that is greater than the first quantity of information bits.

18. The apparatus of claim 16, wherein the instructions to encode the plurality of code blocks are executable by the processor to cause the apparatus to:
encode information with a high priority into the first subset of code blocks based at least in part on the first subset of code blocks having a sequence known by a receiver.

19. The apparatus of claim 18, wherein:
the information with the high priority corresponds to a medium access control message, a high priority logical channel, a medium access control header, a radio link control header, a physical data convergence protocol header, a transmission control protocol header, or any combination thereof.

20. The apparatus of claim 16, wherein the instructions are further executable by the processor to cause the apparatus to:
receive, in response to the respective signals, a feedback message indicating a first acknowledgment feedback for the first subset of code blocks and a second acknowledgment feedback for the second subset of code blocks.

21. The apparatus of claim 16, wherein the instructions are further executable by the processor to cause the apparatus to:
encode, in a middle portion of the codeword, at least one code block of the first subset of code blocks.

22. The apparatus of claim 16, wherein the instructions are further executable by the processor to cause the apparatus to:
encode, in a middle portion of the codeword, a third subset of code blocks with a lower modulation and coding scheme than a modulation and coding scheme applied for the first subset of code blocks and the second subset of code blocks.

23. The apparatus of claim 16, wherein the instructions to encode the plurality of code blocks are executable by the processor to cause the apparatus to:
encode the first subset of code blocks based at least in part on the first subset of code blocks comprising a zero-power signal.

24. The apparatus of claim 16, wherein the instructions are further executable by the processor to cause the apparatus to:
determine a size of a transport block corresponding to the codeword is based at least in part on a quantity of time-frequency resources of the plurality of time-frequency resources, a modulation and coding scheme for the codeword, and a quantity of code blocks in the second subset of code blocks.

25. The apparatus of claim 16, wherein the instructions are further executable by the processor to cause the apparatus to:
communicate control signaling indicating a mapping of the plurality of code blocks to the plurality of spatial layers across the plurality of time-frequency resources, wherein the encoding is based at least in part on the mapping.

26. The apparatus of claim 16, wherein the instructions are further executable by the processor to cause the apparatus to:
transmit a first code block of the first subset of code blocks via a first spatial layer with a highest channel quality of the plurality of spatial layers, wherein additional code blocks are transmitted based at least in part on an ordering of the plurality of spatial layers based at least in part on corresponding channel qualities.

27. The apparatus of claim 16, wherein the instructions are further executable by the processor to cause the apparatus to:
transmit, via a first time-frequency resource of the plurality of time-frequency resources, a first plurality of portions of a first code block using a first subset of the plurality of spatial layers and a second plurality of portions of a second code block using a second subset of the plurality of spatial layers.

28. A method for wireless communications at a receiving device, comprising:
receiving, via a plurality of time-frequency resources using a plurality of spatial layers, a plurality of code blocks associated with a codeword, wherein the plurality of code blocks comprises a first subset of code blocks that are each received using fewer than all of the plurality of spatial layers and a second subset of code blocks that are each received using all spatial layers of the plurality of spatial layers, each code block of the second subset of code blocks and some of the first subset of code blocks being received in multiple code block portions, each of the multiple code block portions associated with a respective code block being received in different time-frequency resources of the plurality of time-frequency resources and across different spatial layers of the plurality of spatial layers;
decoding a first code block of the first subset of code blocks based at least in part on the first code block being received using fewer than all of the plurality of spatial layers; and
decoding, successively, additional code blocks of the first subset of code blocks or of the second subset of code blocks, or both, based at least in part on cancellation of at least one of the first code block or other previously decoded code blocks of the plurality of code blocks from a respective signal associated with a corresponding one of the additional code blocks and received during a corresponding time-frequency resource of the plurality of time-frequency resources.

29. The method of claim 28, wherein decoding, successively, the additional code blocks comprises:
decoding a first portion of an additional code block of the first subset of code blocks to obtain information bits based at least in part on a cancellation of a second portion of the additional code block of the first subset of code blocks.

30. A method for wireless communications at a transmitting device, comprising:
encoding, for transmission via a plurality of time-frequency resources and via a plurality of spatial layers, a plurality of code blocks associated with a codeword, wherein the plurality of code blocks are encoded into a first subset of code blocks that are each to be transmitted using fewer than all of the plurality of spatial layers and into a second subset of code blocks that are each to be transmitted using all spatial layers of the plurality of spatial layers, each code block of the second subset of code blocks and some of the first subset of code blocks being encoded for transmission in multiple code block portions, each of the multiple code block portions associated with a respective code block being encoded for transmission in different time-frequency resources of the plurality of time-frequency resources and across different spatial layers of the plurality of spatial layers; and
transmitting respective signals during corresponding time-frequency resources of the plurality of time-frequency resources, each of the respective signals including one or more code blocks from the first subset of code blocks, one or more code blocks from the second subset of code blocks, or combinations thereof.

* * * * *